(12) United States Patent
Key

(10) Patent No.: US 7,813,827 B2
(45) Date of Patent: *Oct. 12, 2010

(54) SYSTEM AND METHOD FOR AN ON-LINE JURISDICTION MANAGER

(75) Inventor: Jeffery Manuel Key, Bossier City, LA (US)

(73) Assignee: Praeses Corporation, Shreveport, LA (US)

( * ) Notice: Subject to any disclaimer, the term of this patent is extended or adjusted under 35 U.S.C. 154(b) by 782 days.

This patent is subject to a terminal disclaimer.

(21) Appl. No.: 11/624,939

(22) Filed: Jan. 19, 2007

(65) Prior Publication Data

US 2007/0179911 A1    Aug. 2, 2007

Related U.S. Application Data

(63) Continuation of application No. 09/948,200, filed on Sep. 7, 2001, now Pat. No. 7,181,304.

(60) Provisional application No. 60/231,165, filed on Sep. 7, 2000.

(51) Int. Cl.
   *G06F 19/00*   (2006.01)
   *G06Q 99/00*   (2006.01)

(52) U.S. Cl. ........................ 700/100; 705/1.1

(58) Field of Classification Search ........... 700/99–101; 705/1, 4, 7–11, 1.1; 707/8–10, 104.1, 201
   See application file for complete search history.

(56) References Cited

U.S. PATENT DOCUMENTS

| | | | |
|---|---|---|---|
| 5,459,304 A | 10/1995 | Eisenmann | |
| 5,521,815 A | 5/1996 | Rose, Jr. | |
| 5,623,403 A | 4/1997 | Highbloom | |
| 5,664,112 A | 9/1997 | Sturgeon et al. | |
| 5,726,884 A | 3/1998 | Sturgeon et al. | |
| 5,723,884 A | 5/1998 | Sturgeon et al. | |
| 5,752,054 A | 5/1998 | Garber et al. | |
| 5,793,636 A | 8/1998 | Cooney et al. | |
| 5,884,275 A | 3/1999 | Peterson et al. | |
| 5,890,129 A | 3/1999 | Spurgeon | |
| 5,899,978 A | 5/1999 | Irwin | |
| 5,950,150 A | 9/1999 | Lloyd et al. | |
| 5,950,169 A | 9/1999 | Borghesi et al. | |
| 5,970,476 A | 10/1999 | Fahey | |
| 5,987,474 A | 11/1999 | Sandifer | |
| 6,064,968 A | 5/2000 | Schanz | |
| 6,065,000 A | 5/2000 | Jensen | |

(Continued)

*Primary Examiner*—M. N. Von Buhr
(74) *Attorney, Agent, or Firm*—Morris Manning Martin LLP; John R. Harris, Esq.

(57) ABSTRACT

The jurisdiction online manager manages required jurisdictional inspections mandated by a plurality of different jurisdictions performed by non-governmental entities. A central computer system receives object data for an object and most other information via a global computer network, typically the Internet. Based upon the provided object data, the jurisdiction online manage can determine the controlling jurisdiction for the object. The controlling jurisdiction is the jurisdiction in which the object is located. After determining the controlling jurisdiction, the jurisdiction's inspection form or a similar inspection template can be provided to the inspectors, who will perform the actual physical inspections of the objects. After receiving inspection result data from the non-governmental inspection, the inspection result data is stored the system database. The inspection result data is then provided to the controlling jurisdiction. The controlling jurisdiction reviews the result data online and result data is provided to the inspection entity.

36 Claims, 21 Drawing Sheets

U.S. PATENT DOCUMENTS

| | | |
|---|---|---|
| 6,067,549 A | 5/2000 | Smalley et al. |
| 6,097,995 A | 8/2000 | Tipton et al. |
| 6,122,622 A | 9/2000 | Wiitala |
| 6,122,635 A | 9/2000 | Burakoff et al. |
| 6,170,742 B1 | 1/2001 | Yacoob |
| 6,256,640 B1 | 7/2001 | Smalley et al. |
| 6,341,287 B1 | 1/2002 | Sziklai et al. |
| 6,557,009 B1 | 4/2003 | Singer et al. |
| 6,904,412 B1 * | 6/2005 | Broadbent et al. ............ 705/38 |
| 7,330,817 B1 * | 2/2008 | Exall et al. ..................... 705/1 |
| 7,558,793 B1 * | 7/2009 | Topolovac et al. ............. 707/9 |
| 7,610,312 B1 * | 10/2009 | Topolovac et al. ....... 707/104.1 |
| 7,627,391 B2 * | 12/2009 | Key ......................... 700/100 |
| 2002/0023109 A1 | 2/2002 | Lederer et al. |

* cited by examiner

VIEW/EDIT LOCATION - *COMPANY NAME*

☐ LOCATION DETAILS 1710
☐ CONTACT DETAILS 1720
☐ OBJECTS AT THIS LOCATION 1730

1740 ORDER BY: [OBJECT TYPE ▼]   SHOW: [ALL OBJECTS ▼]

1750 ☐ 1755 VIEW FIRETUBE BOILER - LA1234567 - *MANUFACTURER*'S - 1998 - LAST:10/05/00 - DUE 12/05/00 - *INSURANCE CO.*
   EDIT 12/12/00 - INSPECTION EXT - NON-CERTIFICATE - NOT SCHEDULED
   VIEW 10/05/00 - INSPECTION INT - CERTIFICATE - CERTIFICATE ISSUED
   VIEW 10/05/00 - RECOMMENDATION - AIR - *INSPECTOR*
   VIEW 10/05/99 - INT - CERTIFICATE - CERTIFICATE ISSUED
   VIEW 10/05/99 - VIOLATION (CLEARED) - SAFETY VALVE - *INSPECTOR*
       ▶
       ▶

☐ VIEW FIRETUBE BOILER - LA1234567 - *MANUFACTURER*'S - 1998 - LAST:10/05/00 - DUE 12/05/00 - *INSURANCE CO.*
☐ VIEW FIRETUBE BOILER - LA1234567 - *MANUFACTURER*'S - 1998 - LAST:10/05/00 - DUE 12/05/00 - *INSURANCE CO.*

☐ PREVIOUS RECOMMENDATIONS AND VIOLATION AT THIS LOCATION 1760

OBJECT (E.G. BOILER) WEB PAGE FOR ENTRY/
EDIT OF OBJECT DETAILS

1800

OBJECT DETAILS

VIEW/EDIT BOILER
BOILER DETAILS

| | | | |
|---|---|---|---|
| JURISDICTION # | | STATUS | ACTIVE ▶ |
| OTHER # | | OTHER # TYPE | |
| DATE LAST INSPECTED | 01/01/01 | OWNER # | |
| LOCATION IN PLANT | | TYPE | MFG ▶ |
| MANUFACTURER | | INSTALLED NEW | |
| YEAR INSTALLED | | MANHOLE INSTALLED | |
| USE | | FUEL | |
| METHOD OF FIRE | AUTO ▶ | TOT HEATING SURFACE | |
| INPUT (BTU/HR) | | INPUT (ELECT) | |
| CAPACITY (LITERS) | | # SAFETY RELIEF VALVES | |
| REL CAP REQUIRED | | CAP PROVIDED | GAS ▶ |
| CAP TYPE | LBS/HR STM ▶ | LWCO INSTALLED | |
| MAWP | | SYSTEM ID | |

BILLING/OWNER DETAILS SAME AS LOCATION ☐

COMMENTS

1820

☐ INSPECTION HISTORY 1830
☐ PAST RECOMMENDATIONS AND VIOLATIONS 1840
☐ OBJECT REPAIRS 1850

[SUBMIT] [CANCEL] [RESET] [DELETE]
1862   1864   1866   1868

REVIEW CHANGES

2000

| | 2010 | 2020 | 2030 | 2040 | 2050 |
|---|---|---|---|---|---|
| | | DATE | TYPE | DESCRIPTION | SUBMITTER |
| | REVIEW | 7/23/200 | LOCATION | 330 MAIN ST | |
| | REVIEW | 8/1/2000 | BOILER | LA104332 - NB342322 | |
| | REVIEW | 8/1/2000 | PV | LA1023577 - NB123123 | |
| | REVIEW | 8/1/2000 | INSPECTION | BOILER - LA1023343 -INTERNAL | |

REVIEW OBJECT WEB PAGE — 2100

REVIEW BOILER EDITS - 10/10/2000 BY *JURISDICTION REVIEWER*

2110 — [ - ] BOILER DETAILS

| | CURRENT VALUE 2140 | OLD VALUE 2150 |
|---|---|---|
| JURISDICTION # | LA1234567 | |
| INS CO # | | |
| OTHER # | NB123456 | |
| DATE LAST INSPECTED | 10/10/1000 | 10/10/1999 |
| INSPECTION FREQUENCY | ANNUAL | |
| SPECIFIC LOCATION | MAIN BLR RM | |
| OWNER # | | |
| MANUFACTURER | CLEAVER | |
| TYPE | PWB | |
| YEAR BUILT | 1972 | |

2120 — [ + ] BILLING/OWNER DETAILS

2130 — [ - ] ENTER COMMENTS HERE

[         ]

[ ACCEPT ]   [ REJECT ]   [ RESET ]
   2160         2170         2180

SYSTEM AND METHOD FOR AN ON-LINE JURISDICTION MANAGER

CROSS REFERENCE TO RELATED APPLICATIONS

The following Patent Application claims priority to the U.S. Provisional Application No. 60/231,165 entitled "Jurisdiction On-line" filed on Sep. 7, 2000.

This is a continuation of application Ser. No. 09/948,200, filed Sep. 7, 2001, now U.S. Pat. No. 7,181,304, which is incorporated herein by reference, and is also related to application Ser. No. 11/624,976 filed Jan. 19, 2007.

TECHNICAL FIELD

The invention relates generally to the field of network-based services and, more particularly, to a jurisdiction online management system that manages required inspections mandated by a plurality of different jurisdictions performed by non-governmental entities.

BACKGROUND OF THE INVENTION

The industrial revolution was made possible by the invention of many different types of machines and other complicated equipment. One significant invention, the boiler, provided the means to convert water in steam, which is still used to power selected motors and to heat mixtures. Modem boilers include many different types of vessels used to heat water, hydrocarbons, and other liquids. These boilers range from simple residential water heaters to complicated oil refinery cracking towers.

In addition, the pressure vessel enabled the evolution of sophisticated chemical processes that must take place under high pressure or under vacuum. Pressure vessels became increasingly important as our understanding of chemistry and chemical reactions grew. Today, pressure vessels are used in the production processes of virtually every manufacturing industry.

As a consequence of their usefulness, pressure vessels and boilers have become relatively common equipment. In fact, a large university can house over 900 of these objects. The prevalence of these objects along with the inherent associated danger mandate that these objects be manufactured and operated safely.

In the 1800s, boiler and pressure vessel explosions were common. Several explosions that resulted in significant loss of life prompted the adoption of codes that dictated the design specifications and performance requirements for new equipment. Gradually various states, municipalities, and other jurisdictions adopted these codes and mandated the continued evaluation and inspection of existing equipment. Most of these jurisdictions established laws to enforce the codes.

In most states, the laws specified that the insurance company covering the equipment against property loss must provide licensed inspectors to examine the equipment and report the inspection results to the jurisdiction. Obviously, the insurance companies have a vested interest in assuring the safe operation of these objects. Government inspectors perform the inspections and reporting tasks on non-insured equipment. The frequency of these inspections is based upon the size and type of the vessel and can vary from twice per year to once every three years.

The current process for reporting the inspections is done with paper forms supplied by the jurisdiction in which the vessel is located. An administrator at the insurance company manages the active policies, which have boiler and pressure vessel coverage. The administrator determines the inspections' due dates and allocates the inspections among the company's inspectors authorized in the subject jurisdiction. The administrator copies and to sends the inspector the form or information from the prior years, if available. The inspector makes the inspection, fills out the form, and sends it to the designated office within the insurance company. The designated office makes a copy and forwards the original to the appropriate jurisdictional department for review.

Each insurance company has a multiple forms arriving each day from its inspectors. The home office personnel must determine which forms go to which jurisdictions, which files get which copies, and track down the files, etc. Approximately 15% of the inspections are not approved by the jurisdiction upon the first review. The jurisdictional reviewer will note the changes required and transmit the form back to the insurance company. The insurance company routes the transmittal back to the inspector, who completes the work in a manner acceptable by the jurisdiction. Upon acceptance of the inspection, the jurisdiction grants a certificate of compliance.

The paper flow method is very cumbersome, time consuming, inefficient, and involves many steps. The process has a high cost related to the submission of inspection data including the costs associated the mailings, filings, routing, reviews, and lost paperwork. The current practices generally results in many inefficiencies such as multiple data entry and non-optimal scheduling of upcoming inspections. Furthermore, the current system has significant costs associated with inaccurate data resulting in late inspections and multiple revisits.

The aforementioned problems are further compounded when a company switches insurance carriers. In this situation, the insurance company does not have access to historical data and begins building its own separate files. The lack of historical data dramatically increases the chances for the need for a re-inspection. In addition, all background information must be collected and re-entered, which increase the odds of poor data. Due to the competitive nature of the insurance business, companies may switch insurance carriers on a non-infrequent basis.

Several solutions have been attempted to solve some of the problems associated with the paper transfer process. Some states have tried to develop their own jurisdictional software. However, there exists over 60 regulated jurisdictions including states, municipalities, and Canadian provinces. In this situation, many difficulties arise because there is not a common insurance company interface or program. It would be extremely expensive and difficult for the insurance companies to support and maintain the multitude of interfaces required. In addition, user interface for the inspectors will not be consistent. Cross-company reporting would be extremely difficult. Furthermore, it is expensive for each jurisdiction to develop, roll out, and maintain separate software programs.

Another option is electronic jurisdiction interfaces. Clearly, this method is extremely costly for each entity to develop their own software. Except for the largest insurance carriers, the cost may be prohibitive. Insurance companies would have to support up to 67 different formats, which could be worse than a paper system. In addition, the jurisdictions will be slow to embrace the process, making it terribly inefficient and expensive until a substantial majority of the jurisdictions allow the process. Further complicating the process is the variable domains and data fields required by each different jurisdiction. It is extremely unlikely that the jurisdiction will agree on common data types and domains. Additionally, flat data files are non-hierarchical in nature, which can create update difficulties. Clearly, the data transfer is not-in real time and any workflow support would be minimal. Moreover, in an electronic data transfer system, additional features are not easy to add. In addition, many governors are mandating web applications for governmental functions.

Clearly, a need exists for an efficient, economical process for the transfer of information between jurisdictions and the entities that are mandated to perform required activities.

SUMMARY OF THE INVENTION

The present invention meets the needs described above in a jurisdiction online manager. The system provides an efficient, centralized, and web enabled process for the transfer of data between multiple jurisdictions and multiple entities required to routinely interact with the multiple jurisdictions. The system manages required inspections mandated by a plurality of different jurisdictions performed by non-governmental entities. The system is applicable to pressure vessels, boilers, elevators, amusement park rides, and other required jurisdictional inspections of objects.

The system provides a central staging database for data. Consequently all insurance company have a common interface and programs to support their mandated inspection functions. Hence, the inspectors have only one user interface with which to cope. In addition, the jurisdictions do not have to agree on the types, domains, or any other information because the system supports multiple jurisdiction forms. Because the jurisdictions do not have to agree on standards or need to invest in expensive development, the system should achieve early adoption by the jurisdictions.

The centralized system provides a hierarchical data structure that allows for easy updates and reverse delta storage. Furthermore, the central system enables real time availability of current data. Moreover, data validation can be performed as well as enforceable data fields and domains. Additionally, complete historical information about the stored objects can be available online.

Generally speaking, the invention manages required inspections mandated by a plurality of different jurisdictions performed by non-governmental entities. A central computer system receives object data for an object and most other information via a global computer network, typically the Internet. The object data is stored in a system database. Based upon the provided object data, the jurisdiction online manager can determine the controlling jurisdiction for the object. The controlling jurisdiction is the jurisdiction in which the object is located. After determining the controlling jurisdiction, the jurisdiction's inspection form or a similar inspection template can be provided to the inspectors, who will perform the actual physical inspections of the objects. In most cases, non-governmental inspectors perform the inspections. These inspectors generally work for inspection entities, usually insurance companies that perform the mandated inspections in a plurality of different jurisdictions.

After receiving inspection result data from the inspection, the inspection result data is stored the system database. The inspection result data is then provided to the controlling jurisdiction. The controlling jurisdiction reviews the result data online and any review result data is stored in the system database. The reviewed result data is provided to the inspection entity, which can view the results online.

The system can manage most aspects of the statutorily required inspections. Other aspects of the managed inspection process can include managing inspector commission information. The inspector commission status can be verified prior to accepting inspection results by that inspector. In addition, the system can manage payment information. The system can receive payment information and verify object status prior to providing issuance of an object certificate of compliance. Lack of payment or any current violations can block the issuance of a compliance certificate. Furthermore, the system can perform scheduling functions. The system can automatically determine objects with upcoming inspections due dates and provide this information to the inspection entity. Inspectors at the inspection entity can calendar the inspections as desired.

BRIEF DESCRIPTION OF THE DRAWINGS

FIG. 17 is a screen shot illustrating a location edit web page.

FIG. 18 is a screen shot illustrating a boiler edit web page.

FIG. 19 is a screen shot illustrating an inspection edit web page.

FIG. 20 is a screen shot illustrating a review changes web page.

FIG. 21 is a screen shot illustrating a review boiler edit web page.

DETAILED DESCRIPTION OF THE EMBODIMENTS

The described embodiment discloses a system that provides an efficient management of the required regulatory inspections of boilers and pressure vessels in multiple jurisdictions. The jurisdiction online manager (JOM) is designed to automatically provide the appropriate jurisdiction inspection data requirements and forms to commissioned inspectors from a plurality of insurance carriers. Although the described embodiment refers to boiler and pressure vessel inspections, those skilled in art can readily appreciate that the system is equally advantageous in other scenarios involving multiple regulating agencies which do not perform the actual regulated function including inspections of elevators, amusement park rides, and the like.

The disclosed embodiment provides a cost-effective system for the performance and jurisdictional review of boiler and pressure vessel inspections. The complexity of ensuring proper data nomenclature and format required by each specific jurisdiction is solved by the is jurisdiction online manager. In addition, the system provides a comparison of changed information to facilitate efficient review of the inspection by the appropriate jurisdiction. The system also manages the payment of proscribed fees and the issuance of certificates. In summation, the jurisdiction online manager directs the inspection process from installation of the object to the object's decommission.

Figure 1:
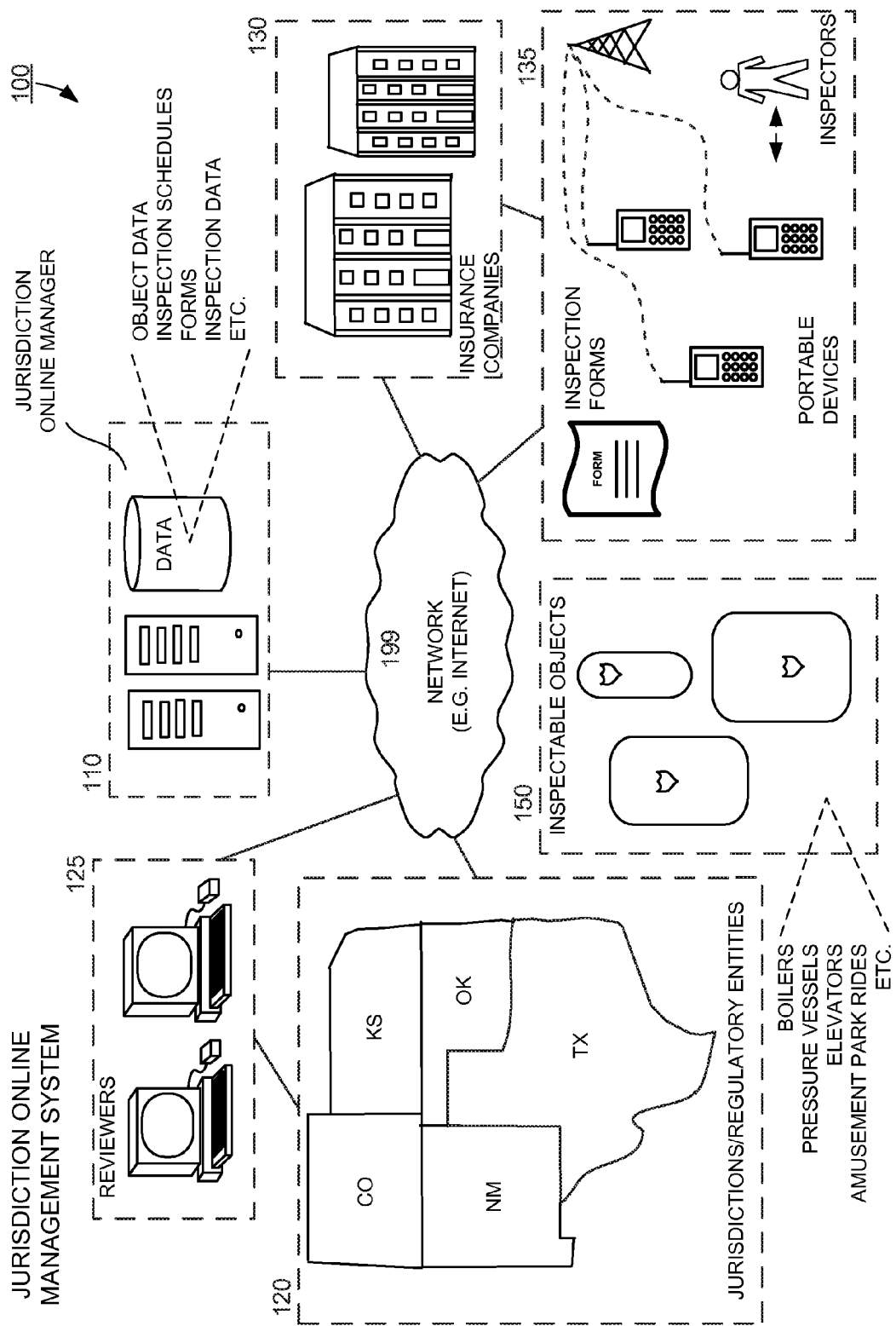
FIG. 1 is a functional block diagram illustrating a jurisdiction online management system.

Turning to the figures, in which like numerals indicate like elements throughout the several figures, FIG. 1 illustrates a jurisdiction online management system 100 constructed in accordance with an embodiment of the present invention. The system 100 is connected for computer communications via a known global computer network commonly known as the Internet 199. It is known in the art to send packets of information via the Internet. One common protocol for the transfer of data via the Internet 199 is the Transfer Control Protocol Internet Protocol (TCP/IP).

The disclosed jurisdiction online management system 100 includes a jurisdiction online manager 110. The jurisdiction online manager 110 stores object data, schedules inspections, provides the appropriate jurisdiction forms, accepts inspection data, provides inspection and repair data for jurisdictional review, accepts repair information, accepts payment, provides inspection certificates, and provides other functions which facilitate the boiler and pressure vessel inspection process. A flow chart of the inspection process is illustrated in reference to FIG. 2. In addition, illustrations and flow charts describing the jurisdiction online manager 110 constitute the remaining figures.

Boilers and pressure vessels 150 are devices that operate under pressure. A boiler 150 generates steam by the application of energy, and a pressure vessel 150 contains pressure without the application of energy. Many facilities ranging from fast food restaurants and universities to industrial complexes utilize pressure vessels and boilers 150 during their normal operation. Objects 150 under pressure can be dangerous if they are not properly maintained and operated.

Jurisdictions 120 are the regulatory entities that set the safety requirements and govern the issuance of certificates of compliance. Jurisdictions 120 are typically states, cities, or Canadian provinces. Each regulatory entity 120 has the authority to determine the required inspections and the inspection frequencies for pressure vessels and boilers 150 within their jurisdiction. In addition, each jurisdiction requires the inspection information in its format utilizing its categories and domains. Reviewers 125 at each jurisdiction 120 evaluate each inspection, repair, and other data to ensure compliance with the jurisdiction's requirements. Upon acceptance of the inspection data, the jurisdiction 120 authorizes the issuance of a compliance certificate that enables the object 150 to legally continue operating.

Insurance companies 130 provide insurance coverage for most pressure vessels and boilers 150. Since the insurance companies 130 have a vested interest in ensuring safe performance, the jurisdictions 120 have delegated the responsibility of inspecting these objects 150 to the insurer. The insurance companies 130 provide the inspectors 135 that physically travel to the object's location and perform the required inspections. An inspector 135 must be qualified by a jurisdiction 120 and receive a commission in order to perform an inspection in that jurisdiction 120. An inspector 135 can access the jurisdiction online manager 110 via the Internet 199 and print an inspection form for that jurisdiction prior to performing the inspection. Alternatively, the inspector 135 can enter the inspection data directly on-line through the use of a portable computing device utilizing wireless application protocol (WAP), or other suitable communication device.

Figure 2:
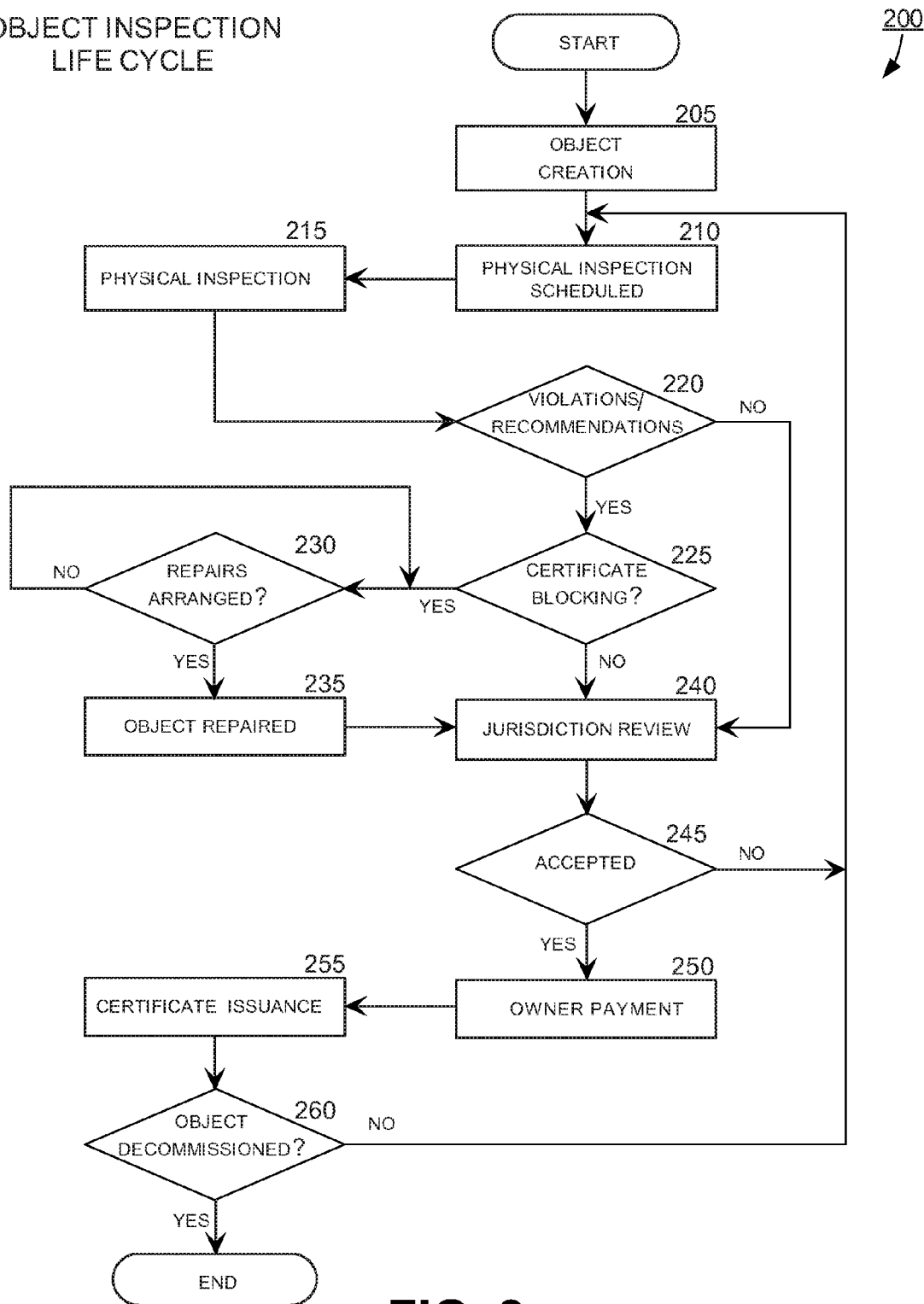
FIG. 2 is a flow diagram illustrating an object inspection life cycle.

FIG. 2 discloses a flow diagram of an object inspection life cycle 200. The life cycle begins at step 205 with the object's creation. An object built to ASME code standards can be registered with the Nation Board of Boiler and Pressure Vessel Inspectors. Registration is legally required in most National Board Member jurisdictions. After an object is installed, the object requires an inspection.

Step 205 is followed by step 210, in which a physical inspection is scheduled. Some jurisdictions require that the initial inspection must be performed by the jurisdiction. Other jurisdictions allow the insurance carrier to perform the inspection. In any event, all pressure vessels and boilers are required to receive a physical inspection after installation.

Step 210 is followed by step 215 in which the physical inspection is performed. Inspections must be performed by an inspector commissioned to perform inspections in that particular jurisdiction. The commissioned inspector travels to the installation site and performs a physical inspection. Each jurisdiction may require recordation of different data, may have different domains, and may have diverse object categories.

Step 215 is followed by step 220, in which the inspector determines whether to issue a violation or make a recommendation. Examples of volitions include insufficient combustion air available for a boiler, improperly set safety valve, or unsuitable clearance. A recommendation is a non-mandatory suggestion to improve the safety of the object. If no violations or recommendations have been cited, the NO branch of step 220 is followed to step 240, in which the jurisdiction performs a review. If a violation or recommendation has been cited, the YES branch of step 220 is followed to step 225, in which the inspector determines if the cited problem is certificate blocking.

If the cited problem is not certificate blocking, the NO branch of step 225 is followed to step 240. If the cited problem is certificate blocking, the YES branch of step 225 is followed to step 230, in which the owner arranges for repair the object. If the object is not repaired, the NO branch of step 230 is followed to step 230, in which the owner arranges for repair. Violations must be rectified before the jurisdiction will allow the object to be placed into service. After arranging for repairs, the YES branch of step 230 is followed by step 235, in which an authorized repairer makes the necessary changes to bring the object within specifications. Step 235 is followed by 240.

In step 240, the jurisdiction reviews the inspection data and any resultant repairs. Reviewers within the jurisdiction review any repairs and inspections to ensure compliance with the jurisdiction requirements and ensure the validity of the data submitted. Step 240 is followed by step 245, in which the reviewer determines to accept the inspection and any associated repairs. If the inspection is not accepted, the NO branch of step 245 is followed to step 210 for inspection of the repairs or reinspection because of conflicting data. If the inspection is accepted by the reviewer, the YES branch of step 245 is followed to step 250.

In step 250, the owner makes the requisite fee payment. Step 250 is followed by step 255 wherein upon receipt of the fee, a certificate for the object is issued. Step 255 is followed by step 260, wherein the owner decides whether the object will be decommissioned. If the object is not to be decommissioned, the NO branch of step 260 is followed to step 205, in which the next inspection is scheduled. Each jurisdiction has the authority to set the inspection schedule required for any object. If the object is to be decommissioned, the YES branch of 260 is followed, the object is decommissioned, no further inspection are required, and the inspection life cycle is completed.

Figure 3:
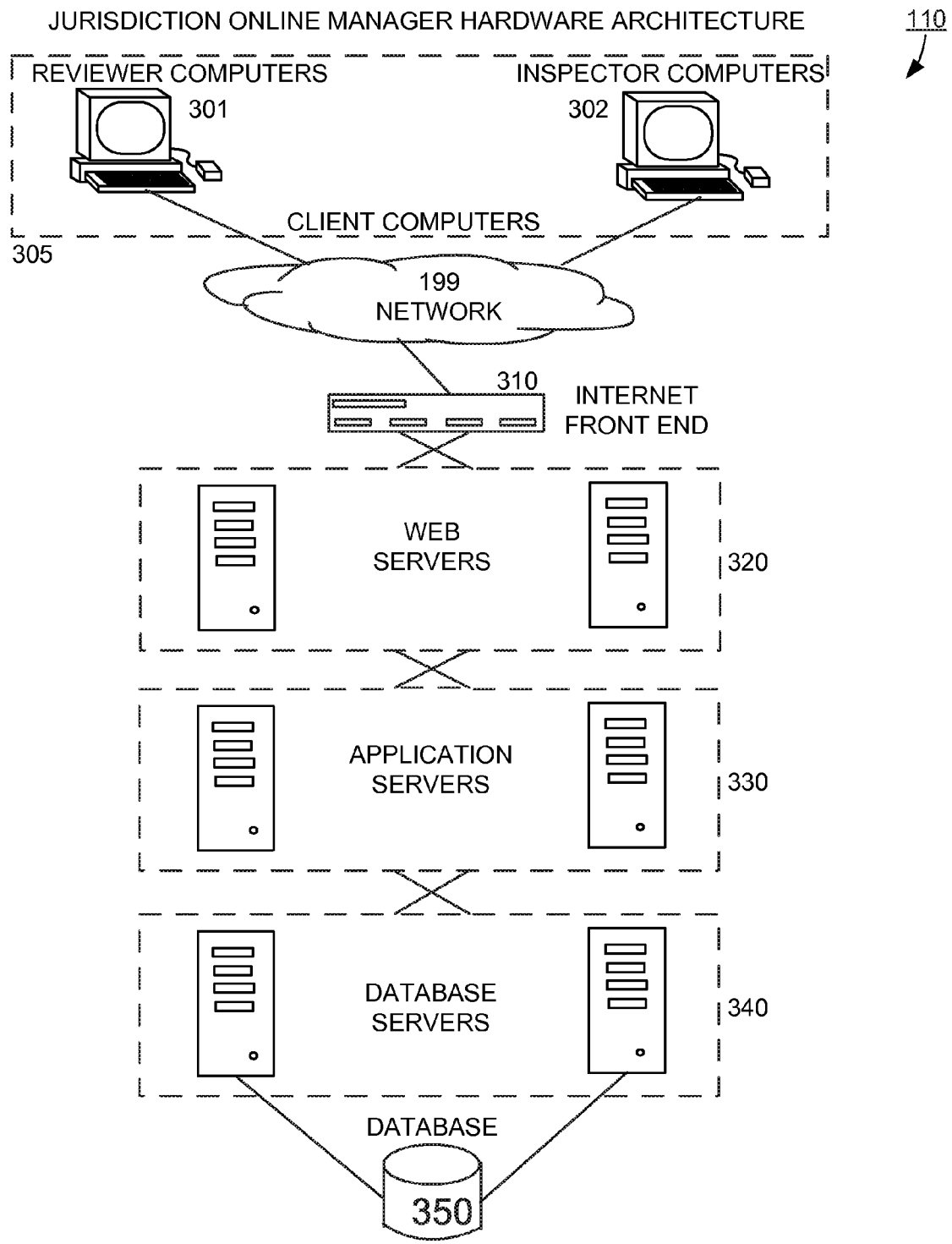
FIG. 3 is a functional block diagram illustrating a hardware architecture for a jurisdiction online manager.

FIG. 3 discloses a hardware architecture of the jurisdiction online manager 110 constructed in accordance with an embodiment of the present invention. As will be understood in the art, the system is constructed utilizing Internet-enabled computer systems with computer programs designed to carry out the functions described herein. The computer programs are executed on computer systems constructed as described in reference to FIG. 3. Although the disclosed embodiments are generally described in reference to Internet is accessible computers, those skilled in the art will recognize that the present invention can be implemented in conjunction with other program units for other types of computers.

The disclosed embodiment of the present invention is implemented in a distributed computing environment such as the Internet. In a distributed computer environment, program units may be physically located in different local and remote memory storage devices. Execution of the program units may occur locally in a stand-alone manner or remotely in a client server manner. By way of illustration and not limitation, distributed computing environments include local area networks (LAN) of an office, enterprise-wide area networks (WAN), and the global Internet (wired or wireless connections). Accordingly, it will be understood that the terms computer, operating system, and application program include all types of computers and the program units designed to be implemented by the computers.

The discussion of methods that follows, especially in the flow charts, is represented largely in terms of processes and symbolic representations of operations by conventional computer components, including a central processing unit (CPU), memory storage devices for the CPU, connected display devices, and input devices. Furthermore, these processes and operations may utilize conventional computer components in a heterogeneous distributed computing environment, including remote file servers, remote computer servers, and remote memory storage devices. Each of these conventional distributed computing components is accessible by the CPU via a communication network.

The processes and operations performed by the computer include the manipulation of signals by a CPU, or remote server such as an Internet web site, and the maintenance of these signals within data structures reside in one or more of the local or remote memory storage devices. Such data structures impose a physical organization upon the collection of data stored within a memory storage device and represent specific electrical, optical, or magnetic elements. These symbolic representations are the means used by those skilled in the art of computer programming and computer construction to effectively convey teachings and discoveries to others skilled in the art.

For the purposes of this discussion, a process is understood to include a sequence of computer-executed steps leading to a concrete, useful, and tangible result, namely, the effecting of the required inspections and reviews of boilers and pressure vessels in multiple jurisdictions.

These steps generally require manipulations of quantities such as owner information data, location information data, scheduled dates, inspection data, review data, and other related information. Usually, though not necessarily, these quantities take the form of electrical, magnetic, or optical signals capable of being stored, transferred, combined, compared, or otherwise manipulated. It is conventional for those skilled in the art to refer to these signals as bits, bytes, words, values, elements, symbols, characters, terms, numbers, points, records, objects, images, files or the like. It should be kept in mind, however, that these and similar terms should be associated with appropriate quantities for computer operations, and that these terms are merely conventional labels applied to quantities that exist within and during operation of the computer.

It should also be understood that manipulations within the computer are often referred to in terms such as displaying, deciding, storing, adding, comparing, moving, positioning, placing, and altering which are often associated with manual operations performed by a human operator. The operations described herein include machine operations performed in conjunction with various input provided by a human operator or user that interacts with the computer. In addition, it will be understood that the programs, processes, routines and methods described herein are not related or limited to any particular computer or apparatus, nor are they related or limited to any particular communication network architecture. Rather, various types of general-purpose machines may be used with program units constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

Figure 4:
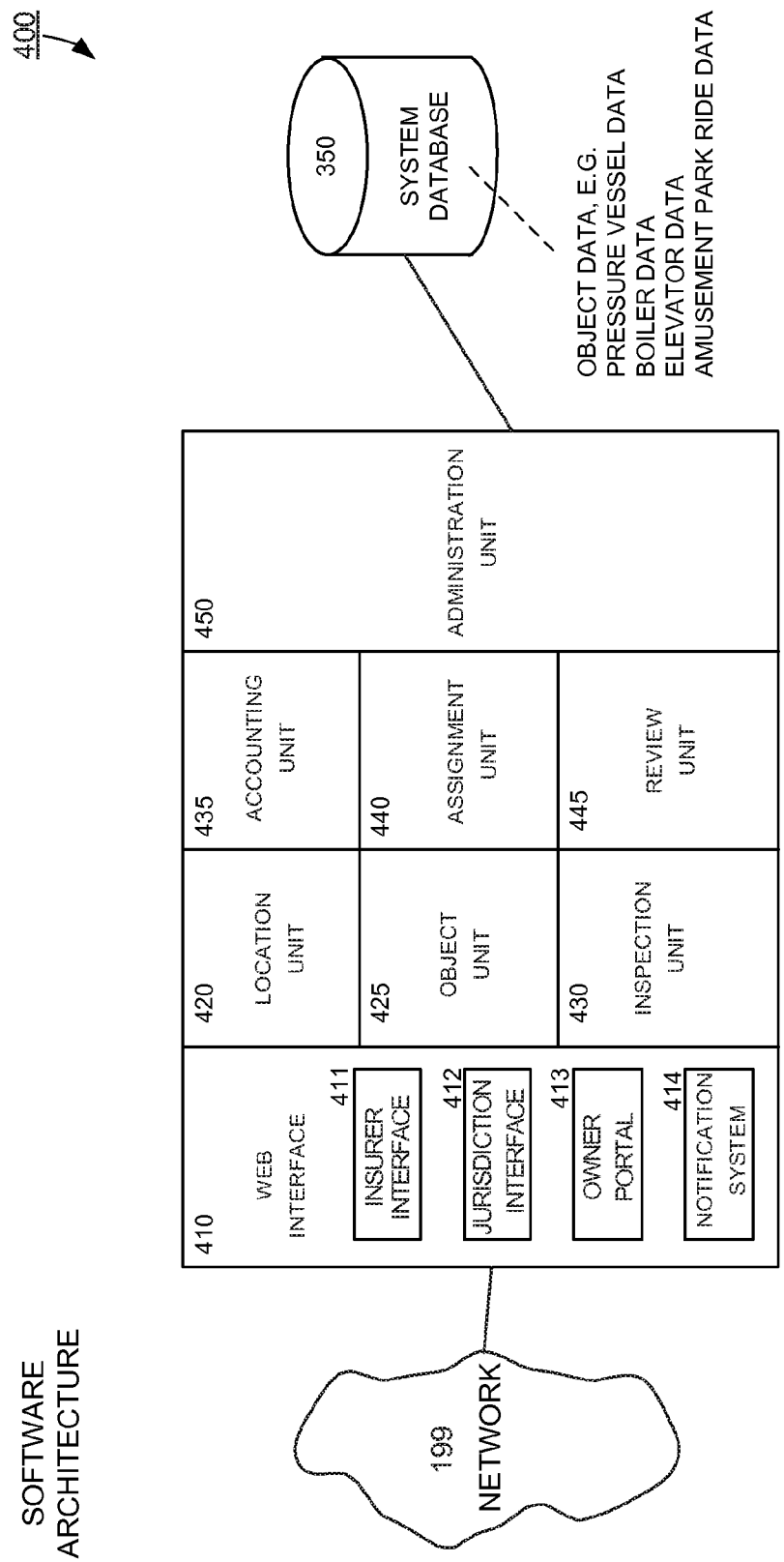
FIG. 4 is a functional block diagram illustrating a software architecture for a jurisdiction online manager.

With the foregoing in mind, the drawing figures starting with FIG. 4 illustrate various functions, processes, or routines carried out by an embodiment of the present invention in which the disclosed jurisdiction online management system 100 carries out the functions described in connection with the flow charts and database maintenance. The functions or processes in these figures are carried out in the disclosed embodiment of the present invention by software executing in computers associated with the jurisdiction reviewers 125, insurance company inspectors 135, and the jurisdiction online manager 110. Depending upon the particular operation, the computers are connected for data communications via a network such as the Internet 199. It will also be understood that the processes and methods presented here may be arranged differently, or steps taken in a different order. In other words, some processes and methods may be deleted, repeated, re-ordered, combined, or blended to form similar processes and methods.

Referring specifically now to FIG. 3, the principal hardware components of the JOM 110 include a tiered application architecture to distribute different applications components over different computers. Please note that other embodiments may combine various application components onto the same servers. Using multiple servers allows the JOM 110 to service multiple requests simultaneously and provides redundancy in case of hardware failures.

The client tier, at which insurance company inspectors 135 and jurisdiction reviewers 125 interface with the jurisdiction online manager 110, consists of inspector client computers 302 and reviewer client computers 301. The client computers 305 run web browsing applications that retrieve and display the jurisdiction online manager's web pages. The client computers 305 retrieve these web pages over a global computer network 199 such as the Internet. Web pages are accessible over the Internet 199 by specifying in the web browser the-page's unique identifier, known as a uniform resource locator (URL). A URL for a web page consists of the domain name or numeric address of a server computer known as web server 320. When a particular web page is required, the client computer 305 makes a request over the Internet 199 to a web server 320.

Internet communications with the JOM 110 are effected by an Internet front end 310 that includes a router, a load balancer, and a firewall. The router is operative in the known manner to send and receive data packets, typically in the form of TCP/IP packets commonly used for Internet communications. The load balancer operates in known manner to balance the load from various communications amongst a plurality of computers or servers that are employed to construct the JOM 110. The data packets pass through a firewall, which ensures the overall security in a known manner before being passed to the web servers 320.

The web servers 320 include a plurality of redundant similarly configured computers, two of which are illustrated, that are operative to implement the front-end software. The web servers 320 are operative to display information to users operating a web browser. The web servers 320 also are operative to provide notifications in a known manner usually via email. The web servers 320 are coupled to application servers 330.

The application servers 330 include a plurality of redundant similarly configured servers, two of which are illustrated, that are operative to implement the application is software. The application server contains the logic that is used to determine which web pages are presented to the user and how to respond to the user's actions. Screen shots of various web pages utilized by the users to interact with JOM 110 are illustrated in FIGS. 16-21. The application software also contains the necessary logic necessary to process the user's transaction and provide the associated updates and any notifications. The application software is discussed in greater detail in reference to FIG. 4. The application servers 330 are coupled to the web servers 320 and the database servers 340.

The database servers 340 include a plurality of redundant similarly configured servers, two of which are illustrated, that are operative to store and retrieve information from a database 350. The database servers 340 are coupled to the application servers 330. Further details of the information stored in the database 350 is provided in connection with FIG. 7.

FIG. 4 illustrates the principal software units or components of the JOM 110 include a web interface 410, a location unit 420, an object unit 425, an inspection unit 430, an accounting unit 435, an assignment unit 440, a review unit 445, a view unit 450, an administration unit, and a report unit 460. Flow charts representing the user interface with these units are described in reference to subsequent FIGS. 8-15. The web interface 410 is operative to receive communications via the Internet 199. In particular, the web interface 410 provides Internet access for an insurer interface 411, a jurisdiction interface 412, an owner portal 413, and a notification system 414. The web interface 411 provides access for the insurance company inspectors 135, jurisdiction reviewers 125, and owners of the objects via a web browser. The web interface 121 is also operative to receive electronic files, which can take the form of multiple dialogues including Electronic Data Interchange (EDI), Extensible Markup Language (XML), and custom flat file formats.

The notification system 414 is operative to send communications to users of the JOM 110. The notification can be accomplished by an e-mail delivered via the Internet 199. Other notification means include an automatically generated telephone call, a facsimile, a wireless communication delivered via a wireless transmitter to a pager, mobile phone, or other wireless device, a wireless message delivery by wireless application protocol (WAP) to a hand held computing device, or other suitable methods for delivering messages.

The location unit 420 is operative to respond to communications, typically via a web browser, for the purpose of accepting or providing location information. Before allowing a user to modify or add location information, the unit 420 ensures the user has the proper authority to perform these actions. Location information includes the location physical address, the company's name and contact information, billing information, the SIC code for the industrial application, and other location related information. The unit 420 performs data entry validation checks to assist in elimination of input errors. In addition, the location unit 420 is operative to call the object unit 425 for the input of object information and the inspection unit 430. The location unit 420 assigns a unique location identifier for each separate location.

The object unit 425 is operative to respond to communications, typically via a web browser, for the purpose of accepting or providing object information. Before allowing a user to modify or add information, the unit 425 ensures the user has the proper authority to perform these actions. Object information includes the jurisdiction number, the manufacturer assigned number, inspection information, location within the plant, year built, year installed, the object's use, means of fire and amount of energy input, capacity, safety relief information, insurance information, and other object related information. The unit 425 performs data entry validation checks to assist in elimination of input errors. In addition, the object unit 425 is operative to call the inspection unit 425 for the input of inspection information and the assignment unit 430. The object unit assigns a unique identifier for each separate object.

The inspection unit 430 is operative to respond to communications, typically via a web browser, for the purpose of accepting or providing inspection information. Before allowing a user to modify or add inspection information, the unit 430 ensures the user has the proper authority to perform these actions. Proper authority to conduct inspections is an inspector commissioned by the jurisdiction in which the object is located. Inspection information includes the object jurisdiction number, inspection date, status, inspector name, the offending condition, the technical requirements, comments, and other inspection related information. The unit 423 performs data entry validation checks to assist in elimination of input errors. In addition, the inspection unit 420 is operative to place the inspection in a queue for a jurisdiction review.

The accounting unit 435 is operative to respond to communications, typically via a web browser, for the purpose of accepting or providing accounting information. Before allowing a user to modify or add payment information, the unit 435 ensures the user has the proper authority to perform these actions. Proper authority is a user authorized by the owner of the object to perform these functions. Accounting information includes payment information, object information, invoice information, and other payment related information. The unit 435 displays invoice amounts, displays payment amounts, and is operative to allow payments for selected objects. Upon payment and verification of acceptable status, the unit is operative to allow the provision of a certificate of compliance.

The assignment unit 440 operative to respond to communications, typically via a web browser, for the purpose of accepting or providing assignment information. Before allowing a user to access or modify assignment information, the unit 440 ensures the user has the proper authority to perform these actions. The work assignment unit automatically schedules inspection for objects with upcoming inspection due dates. The scheduled work assignment is operative to generate and place the task in the insurance company scheduled inspection listing. Upon completion of an inspection or repair, request for variance, or other actions requiring jurisdiction review, the work assignment unit 440 is operative to place the task in a review changes listing in the jurisdiction item task listing. Upon completion of a task, the assignment unit 440 removes the task from its respective task listing.

The review unit 445 is operative to respond to communications, typically via a web browser, for the performance of a jurisdiction review. Before allowing a user to access review information, the unit 445 ensures the user has the proper authority to perform these actions. Proper authority to conduct reviews is a reviewer authorized by the jurisdiction to perform this function. The unit 445 is operative to display the information requiring a review, to display any changes in the reviewed information to assist in the review process and to accept comments. Upon acceptance of a review item, the item is deleted from a task listing. Upon rejection of the review, the owner is automatically notified and another inspection is scheduled.

The administration unit 450 is operative to respond to communications, typically via a web browser, for the purpose of administration functions. The administrative functions include adding and setting rights for other users, administrating system messages and safety bulletins, and tracking users. System message or safety bulletins are global messages that appear on user home pages. These messages can have the scope of the insurance company users, jurisdiction employees, jurisdiction users, or system wide. The scope of control lo determines the scope of display. Additionally, the administration unit is operative to add, delete, or edit users. The user information includes the user's password and user name, contact information, and the role the user can perform. The roles or groups determine the user's settings and permissions. Typical user groups include chief inspector, data entry, accounting, work assignment, reviewer, and inspector. In addition, the administration unit 450 is operative to set commissions. Commissions determine in which jurisdictions a user can operate. The commission information includes the commission number, the jurisdiction, along with start and end date of the commission. An inspector's commission must be valid for the JOM to authorize access to perform inspections.

According to an aspect of the invention, the computer programs described above collectively provide functions or components that form a jurisdiction online manager that provides a vastly improved system for the performance in multiple jurisdictions of regulatory required functions by non-jurisdictional employees. Greater details of these various functions and software components are described in subsequent Figs.

Figure 5:
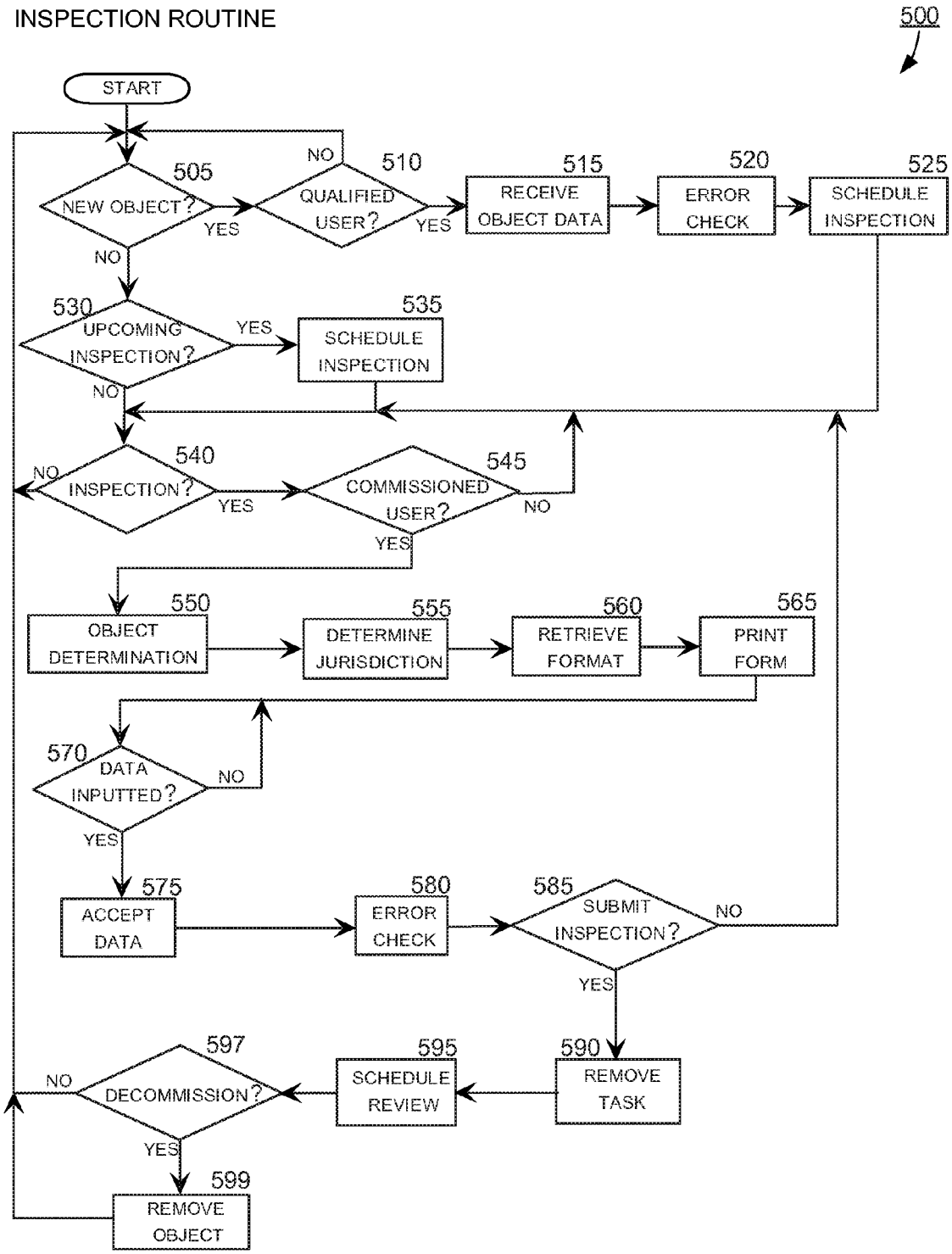
FIG. 5 is a flow diagram illustrating an inspection routine.

FIG. 5 illustrates an inspection routine process executed by the JOM. The process is initiated by step 505, wherein the JOM determines whether new object information is to be entered. The determination is made by the selection of add object in the location unit. If object information is not to be entered, the NO branch of step 505 is followed to step 530, in which the JOM analyzes the database to determine those objects requiring scheduling of an inspection. If new object information has been selected, the YES branch of step 505 is followed to step 510.

In step 510, the JOM determines if the user has the required permissions to enter new object information. Permissions are set by the administration unit described in reference to FIG. 4. If the user does not have the requisite permission setting, the NO branch of step 510 is followed to step 505, in which a determination is made as to whether the user desires enter new object information. If the user does have the requisite permission setting, the YES branch of step 510 is followed to step 515, in which the JOM receives the object information entered via the user's web browser.

Step 515 is followed by step 520, in which the JOM performs error checking on the entered information. The user is prompted to verify inputted information accuracy upon determination of a possible input error. After the error check process, the information is stored in the JOM database. Information storage in the database is described in greater detail in reference to FIG. 7.

Step 520 is followed by step 525, in which the JOM schedules the object for an inspection. The JOM determines from the object information in which jurisdiction the object is located. Some jurisdictions perform all initial inspections themselves. In these jurisdictions, a task will be generated and placed in a task listing for that jurisdiction. In jurisdiction where the initial inspection will be performed by the insurer, a task will be generated and placed in a task listing for that insurance company. Step 525 is followed by step 530.

In step 530, the JOM determines if any object requires inspections in the near future. If no object requires an upcoming inspection, the NO branch of step 530 is followed to step 540, in which a determination is made on whether a user desires to perform an inspection. If an object requires an upcoming inspection, the YES branch of step 530 is followed to step 535, in which the inspection is scheduled. The JOM computes the required inspection based upon the last performed inspection and the required inspection frequency. In step 535, a task is generated and placed in a task listing for the covering insurance company for those objects with upcoming required inspections. Step 535 is followed by step 540.

In step 540, the JOM determines if a user desires to perform an inspection. Commissioned users on their homepages have a task listing with a hot link to the individual objects requiring inspections. Additionally, an inspection can be requested via the inspection unit described in reference to FIG. 4. If the user does not desire to perform an inspection, the NO branch of step 540 is followed to step 505, in which the cycle is repeated. If the user desires to perform an inspection, the YES branch of step 540 is followed to step 545, in which the JOM determines if the user has a valid commission in that jurisdiction.

In step 545, the JOM determines if the user has a valid commission in that jurisdiction. Commission data is stored in reference to each inspector. If the user does not have a valid commission, the NO branch is followed to step 540, in which the JOM determines if the user desires to perform an inspection. If the user has a valid commission, the YES branch is followed to step 550, in which the JOM determines the selected object. The user is able to select the individual objects that the inspector desires to perform an inspection.

Step 550 is followed by step 555, in which the JOM determines the jurisdiction in which the object resides. The jurisdiction information is stored as a record in the JOM database. The information stored in the database is described in greater detail in reference to FIG. 7. Step 555 is followed by step 560, in which the JOM retrieves the inspection format lo for that jurisdiction. Each jurisdiction has its own categories, domains, and required information. The JOM by utilizing the jurisdiction location data generates an appropriate inspection form based upon that jurisdiction and the object to be inspected. Step 560 is followed by step 565 in which the JOM causes the proper jurisdiction form to be printed. Step 560 is followed by step 570.

In step 570, the JOM determines if the inspector desires to input the inspection information. If the inspector has not selected to input inspection data, the NO branch of step 570 is followed to step 570, in which the JOM awaits for the inspection information to be inputted. If the inspector has selected to input inspection data, the YES branch of step 570 is followed to step 575.

In step 575, the JOM receives the inspection information via interaction with the inspector's web browser. Step 575 is followed by step 580, in which the JOM performs an error check on the inspection information. The inspector is queried to verify any flagged possible inaccuracies. Step 580 is followed by step 585.

In step 585, the submission of the inputted inspection information is determined. If the inspection is not to be submitted by the activation of the cancel button, the NO branch of step 585 is followed to step 540 in which the JOM determines if the inspector desires to enter another inspection. If the inspection is to be submitted by the activation of a submit button, the YES branch of step 585 is followed to step 590.

In step 590, the JOM stores the inspection report in connection with the object and removes the inspection from the task listing. Step 590 is followed by step 595, in the JOM schedules the inspection to be reviewed by the jurisdiction. The JOM generates and places a task in the jurisdiction task listing. The jurisdiction review routine process is described in further detail in reference to FIG. 6.

Step 595 is followed by step 597, in which the JOM determines if the object is to be decommissioned. If the object is to decommissioned the YES branch of step 597 is followed to step 597, in which the JOM removes the association of current objects located at that location. Step 597 is followed by step 505, in which the process is repeated. If the object is to decommissioned the YES branch of step 597 is followed to step 597, in which the inspection process is repeated.

Figure 6:
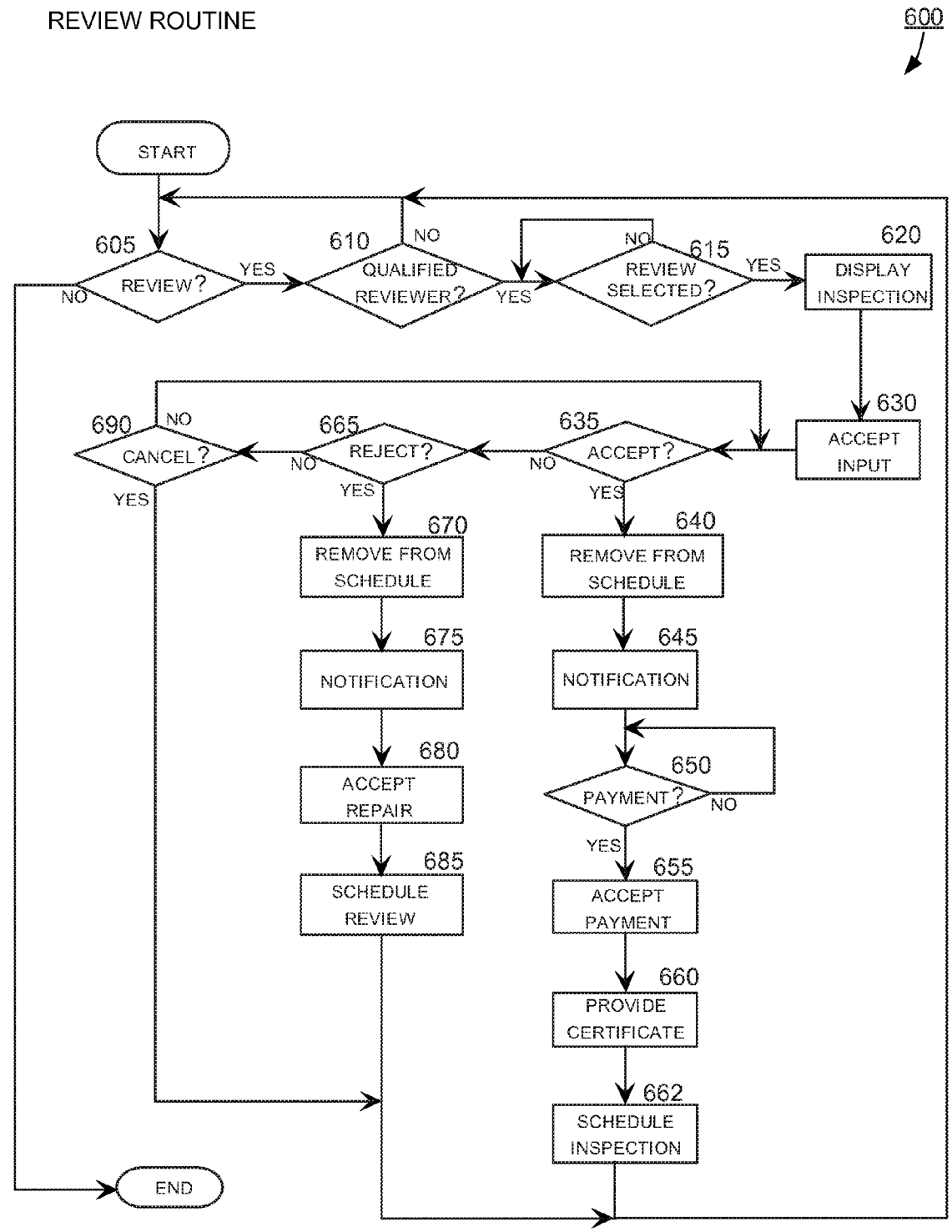
FIG. 6 is a flow diagram illustrating a review routine.

FIG. 6 illustrates a review routine process. The initial step of the routine is step 605, in which the JOM determines if the user desires to perform a review. A jurisdictional reviewer has a hot link to reviews on the user's homepage. If the reviewer has not activated a review request, the NO branch of step 605 is followed and the review routine is completed. If the user desires to perform a review, the YES branch of step 605 is followed to step 610.

In step 610, the JOM determines if the user has the permission setting to perform reviews for the jurisdiction. The user permissions is described in greater detail in reference to the administration unit of FIG. 4. If the user does not have the requisite permission to perform reviews for that jurisdiction, the NO branch of step 610 is followed to step 605, in which the JOM determines if the user desires to perform a review. If the user has the requisite permission to perform reviews for that jurisdiction, the YES branch of step 610 is followed to step 615, in which the JOM determines which review is to be performed. Following the review hot link, the user can select the review desired.

In step 615, the JOM determines the review the user desires to perform. If the user has not selected a particular review, the NO branch of step 615 is followed to step 615, in which the JOM awaits the selection. Upon selection, the YES branch of step 615 is followed to step 620.

In step 620, the JOM display the inspection information for review by the jurisdiction. Step 620 is followed by step 630, in which the JOM receives the review input via interaction with the reviewer's web browser. Step 630 is followed by step 635, in which the JOM determines if the reviewer has accepted the inspection. If the reviewer has not accepted the inspection, the NO branch of step 635 is followed to step 665, in which the JOM determines if the user has rejected the inspected. If the reviewer has accepted the inspection, the YES branch of step 635 is followed to step 640.

In step 640, the JOM stores the review comments along with the review date and the name of the reviewer in association with the inspection and removes the inspection from the task listing. Step 640 is followed by step 645, in which the JOM performs notification of the acceptance and prompts payment. Notification can be performed by email or simply updating the accounting unit to reflect that the payment is due.

Step 645 is followed by step 650, in which the JOM determines if the owner has paid the requisite fees. Fee payment is described in greater detail in the accounting unit in reference to FIG. 4. If the fees have not been paid, the NO branch of 650 is followed to step 650, in which the JOM awaits payment. If the fee payment has been received, the YES branch of 650 is followed to step 655, in which the JOM directs the fee to be applied to this object. Step 655 is followed by step 660, in which the JOM authorizes provision of the certificate. Upon authorization, the owner can requisite a printing of the certificate.

Step 660 is followed by step 662, in which the JOM updates the inspection date. The updated inspection date is used by the JOM to calculate the next required inspection. Step 662 is followed to step 605, in which the review process is repeated.

In step 665, the JOM determines if the reviewer has rejected the inspection. If the reviewer has not rejected the inspection, the NO branch of step 665 is followed to step 690. If the reviewer has rejected the inspection, the YES branch of step 665 is followed to step 670.

In step 670, the inspection is removed from the task listing. Step 670 is followed by step 675, in which notification of the rejected inspection is performed. Notification can be by email or by simply updating the inspection records associated with the object.

Step 675 is followed by step 680, in which the remedial action to correct the rejection is entered into the JOM. Step 680 is followed by step 680, in which a review is scheduled for the repair. The JOM generates a task for another review to be performed by the jurisdiction. Step 685 is followed to step 605, in which the JOM determines if a review is to be performed.

In step 690, the JOM determines whether the reviewer has cancelled the review. If the reviewer has not cancelled the review, the NO branch of step 690 is followed to step 635 in which the JOM determines awaits a determination by the reviewer of the inspection report. If the reviewer has cancelled the review, the YES branch of step 690 is followed to step 605, in which the JOM repeats the review process.

Figure 7:
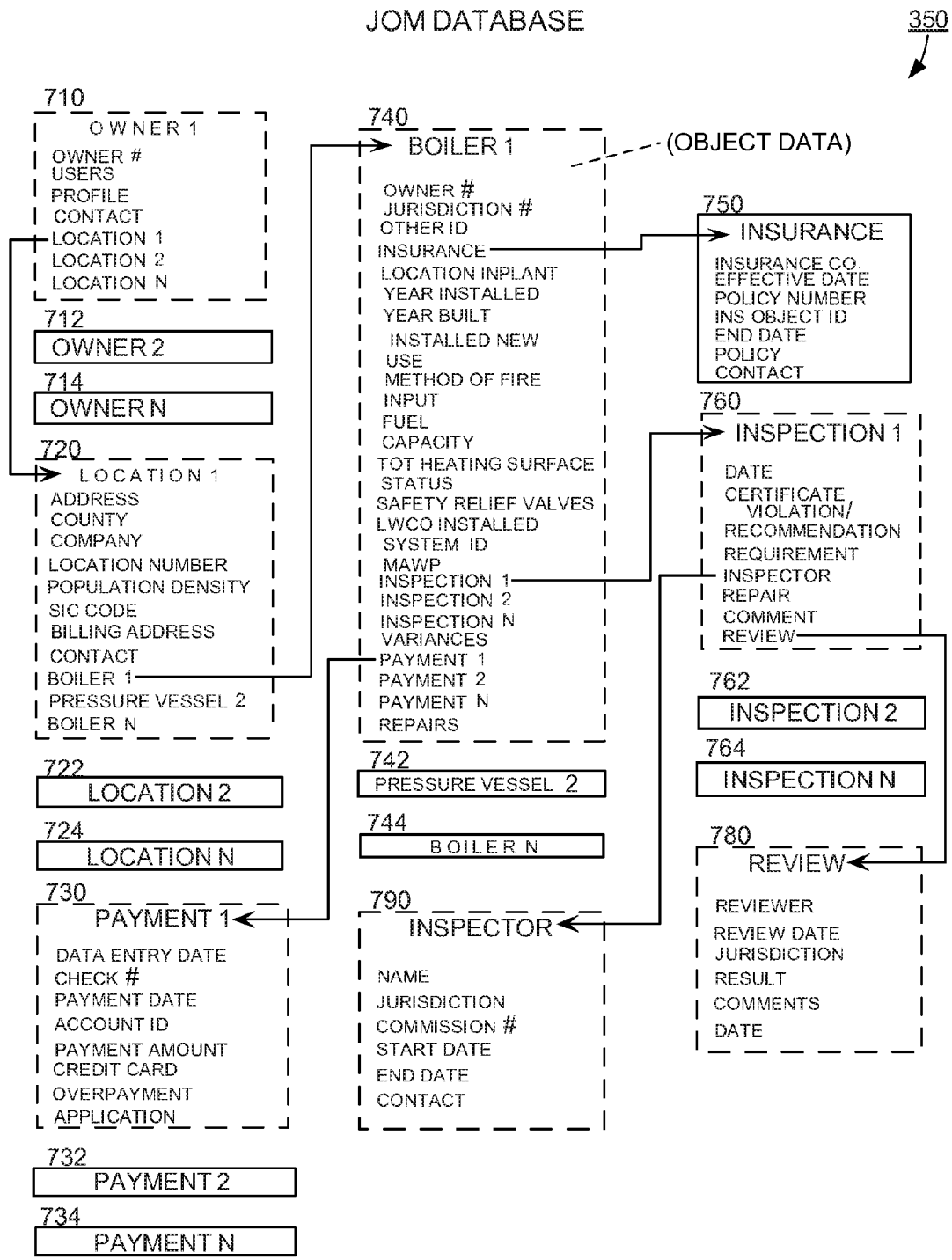
FIG. 7 is a functional block diagram illustrating a database architecture for a jurisdiction online manager.

FIG. 7 illustrates a data file structure of information stored in the JOM database 350. The information illustrated in FIG. 7 is organized logically in conventional data files in the known manner, associated with one or more owners of pressure vessels or boilers.

In accordance with the illustrated embodiment, the JOM stores information associated with a plurality of different owners, e.g. OWNER 1 710, OWNER 2 712, through OWNER N 714. Object owners are associated with locations, e.g. LOCATION 1 720, LOCATION 2 722, through LOCATION N 724. Likewise, locations may be associated with a plurality of objects operated at each location, e.g. BOILER 1 740, PRESSURE VESSEL 2 742, through BOILER N 744. Each object is associated with corresponding insurance information that identifies the insurer and the company that performs the object inspections, e.g. INSURANCE 750. In addition, the objects are associated with their required inspections 760, e.g. INSPECTION 1 760 INSPECTION 2 762 through INSPECTION N 764. Each inspection is associated with an inspector, e.g. INSPECTOR 790 and a review, e.g. REVIEW 780. Information stored in the database 350 can be retrieved for data manipulation and reporting.

In accordance with one disclosed embodiment, owner has certain information associated with it. Illustrated is information stored in connection with a file for OWNER 1 710. Such information includes the company profile. Profile information identifies the company such as by mailing address, nature of the business, and general contact points. Each owner designates the employees, or users, that can authorize certain transactions. The authority level along with a user name and associated password or other security information is stored as user data. The JOM assigns each owner a unique identifier number. In addition, each owner has one or more associated locations.

The location files as illustrated in the LOCATION 1 file 720 stores location information. This information includes the physical address, county, contact information, billing address, and company information. The JOM assigns each location a unique identifier referred to as a location number. In addition the location file 720 stores the SIC (standard industry code) associated with the use of the object. Also, the population density is stored because some regulations may depend on the population density of the area in which the object is used. Each location has associated with it object files, e.g. BOILER 1 740, PRESSURE VESSEL 2 742, BOILER 3 744, for the objects used at the location.

The object file, BOILER 1 740, illustrates the stored detailed information about the object. Each object is identified by its jurisdiction assigned identifier and a separate other identifier such as the manufacturer's number. The object information includes the assigned owner identification; the location of the object, year installed, and if installed new, the year built, capacity of the object, and its current status. If an object is insured, the insurance information, INSURANCE 750, is associated with the object. In addition, information of its use is stored. Additional use data includes the method of fire, energy input, heating surface, and he1 type. Safety information is also recorded in conjunction with object. This safety information includes safety valve information, the maximum allowable working pressure (MAWP), and the low water cut-off (LWCO). If the object is moved and requires a variance, any approved variance by the jurisdiction is recorded. Each object is required to pass periodic inspections to ensure the object is in compliance with the jurisdiction's regulations. The inspection files, e.g. INSPECTION 1760, are associated with the object. Additionally, the payment of the requisite fees must be current before a certificate can be lo issued. Payment information is stored in associated payment files, e.g. PAYMENT 1730. In Addition, object repair information is associated with each object to provide a historical view of the object.

Insurance information is associated with the each object, as illustrated in INSURANCE 750 file. The insurance information includes the company name, the policy information including the effective and end dates, and the contact information. Any identifier utilized by the insurance company to uniquely distinguish the insured object is also recorded. The insurance company is responsible to provide the object inspections.

Object inspections and associated information are stored in the inspection files. INSPECTION 1760 illustrates the information stored in an inspection file. This information includes the inspection date, comments, violations and recommendations, and certificate information. Each inspection has associated with it an inspector and a jurisdiction review.

The jurisdiction review file is illustrated by REVIEW 780. This file includes the reviewer, the review date, jurisdiction performing the review, the result and associated comments.

The inspector file is illustrated by INSPECTOR 790. This file includes the inspector's name, contact information, commission number, the associated jurisdiction for the commission, and the commission's start and end dates.

Issuance of a certificate requires the payment of the requisite fees. The payment information is stored in the payment files, e.g. PAYMENT 1730. The payment file stores the check or credit card information, the data entry date, the account identifier, and payment amount. In addition, overpayments can be allocated to the payment for a different object.

The data stored in the database is not overwritten upon the storage of edit information. The new information is appended to the existing information. A review typically displays the old information as well as the new information to allow the reviewer to easily identify the changes. In most other situation, the JOM display only the latest revised information.

Figure 8:
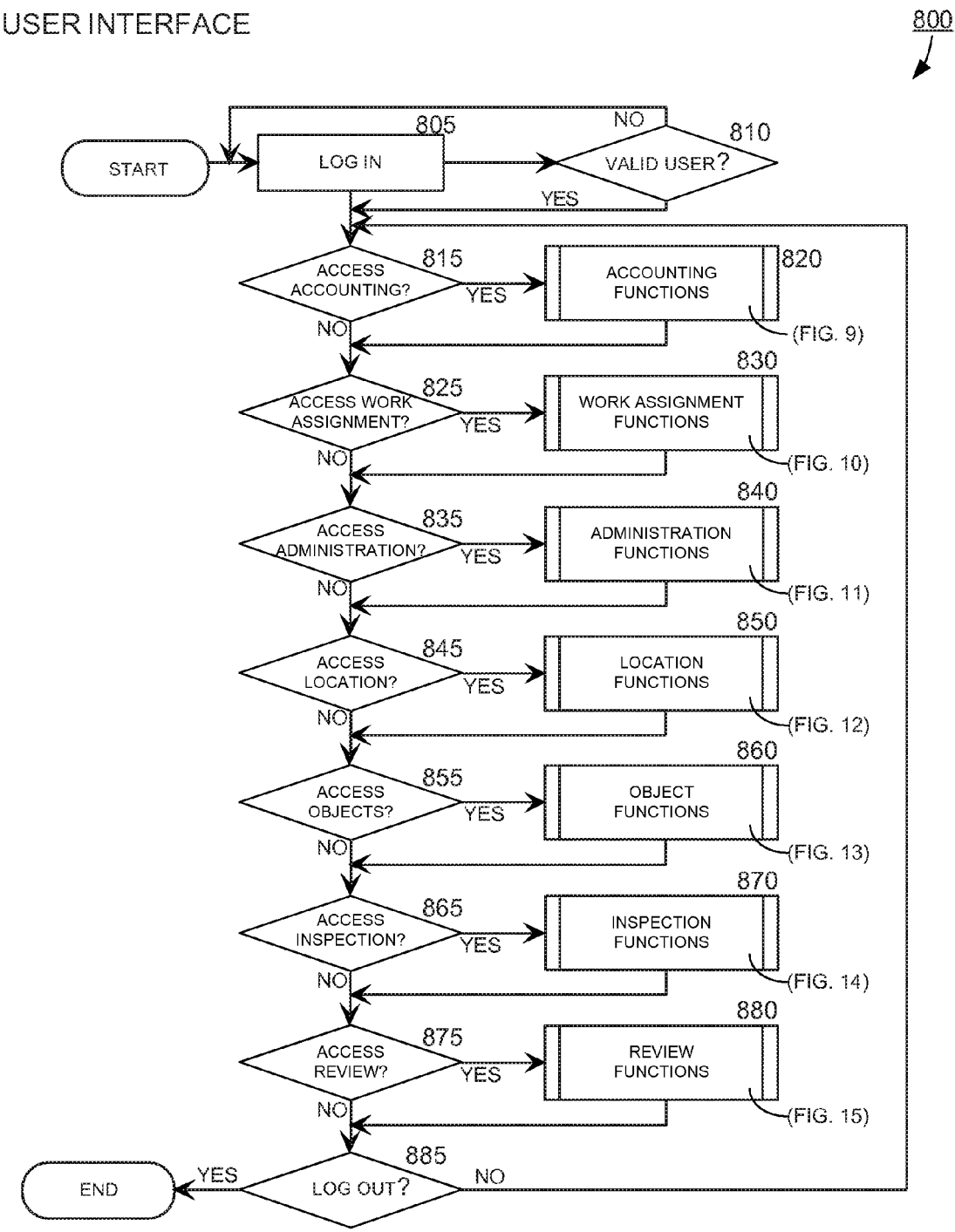
FIG. 8 is a flow diagram illustrating a user interface routine.

FIG. 8 illustrates a flow chart of an embodiment of one user interface process. The process starts at step 805, in which the user requests an access web page provided by the JOM.

The JOM prompts the user for the username and password. Step 810 follows step 805, in which the JOM determines if the user is authorized to the system. If the user is not authorized, access is denied and the NO branch of step 810 is followed to step 805, in which the user may attempt a valid login. If the user is authorized, the JOM provides the user with a homepage generated for that user and the YES branch of step 810 is followed to step 815.

In step 815, the JOM determines if the user has requested to access the accounting unit. A more detailed description of the accounting unit is provided in reference to FIG. 4. If the user has not requested the accounting unit or is denied access, the NO branch of step 815 is followed to step 825, in which the JOM determines if the user desires to access the work assignment unit. If the user has requested the accounting unit and has the requisite permission, the YES branch of step 815 is followed to routine 820, in which the JOM provides access the work assignment unit. Routine 820 is described in greater detail in reference to FIG. 9. Routine 820 is followed by step 825.

In step 825, the JOM determines if the user has requested to access the work assignment unit. A more detailed description of the work assignment unit is provided in reference to FIG. 4. If the user has not requested the work assignment unit or is denied access, the NO branch of step 825 is followed to step 835, in which the JOM determines if the user desires to access the administration unit. If the user has requested the work assignment unit and has the requisite permission, the YES branch of step 825 is followed to routine 830, in which the JOM provides access the work assignment unit. Routine 830 is described in greater detail in reference to FIG. 10. Routine 830 is followed by step 835.

In step 835, the JOM determines if the user has requested to access the administration unit. A more detailed description of the administration unit is provided in reference to FIG. 4. If the user has not requested the administration unit or is denied access, the NO branch of step 835 is followed to step 845, in which the JOM determines if the user desires to access the location unit. If the user has requested the administration unit and has the requisite permission, the YES branch of step 835 is followed to routine 840, in which the JOM provides access the administration unit. Routine 840 is described in greater detail in reference to FIG. 11. Routine 840 is followed by step 845.

In step 845, the JOM determines if the user has requested to access the location unit. A more detailed description of the location unit is provided in reference to FIG. 4, If the user has not requested the location unit or is denied access, the NO branch of step 845 is followed to step 855, in which the JOM determines if the user desires to access the object unit. If the user has requested the location unit and has the requisite permission, the YES branch of step 845 is followed to routine 850, in which the JOM provides access the location unit. Routine 850 is described in greater detail in reference to FIG. 12. Routine 850 is followed by step 855.

In step 855, the JOM determines if the user has requested to access the object unit. A more detailed description of the object unit is provided in reference to FIG. 4. If the user has not requested the object unit or is denied access, the NO branch of step 855 is followed to step 865, in which the JOM determines if the user desires to access the inspection unit. If the user has requested the object unit and has the requisite permission, the YES branch of step 855 is followed to routine 860, in which the JOM provides access the object unit. Routine 860 is described in greater detail in reference to FIG. 13. Routine 860 is followed by step 865.

In step 865, the JOM determines if the user has requested to access the inspection unit. A more detailed description of the inspection unit is provided in reference to FIG. 4. If the user has not requested the inspection unit or is denied access, the NO branch of step 865 is followed to step 875, in which the JOM determines if the user desires to access the review unit. If the user has requested the inspection unit and has the requisite permission, the YES branch of step 865 is followed to routine 870, in which the JOM provides access the object unit. Routine 870 is described in greater detail in reference to FIG. 14. Routine 870 is followed by step 875.

In step 875, the JOM determines if the user has requested to access the review unit. A more detailed description of the review unit is provided in reference to FIG. 4. If the user has not requested the review unit or is denied access, the NO branch of step 875 is followed to step 885, in which the JOM determines if the user desires to log out. If the user has requested the review unit and has the requisite permission, the YES branch of step 875 is followed to step 880, in which the JOM provides access the review unit. Routine 880 is described in greater detail in reference to FIG. 15. Routine 880 is followed by step 885.

In step 885, the JOM determines if the user desires to log out. If the user has not activated a log out button, the NO branch of step 885 is followed to step 815, in which the JOM awaits a determination by the user. If the user has decided to log out, the NO branch of step 885 is followed and the user interface routine is completed.

Figure 9:
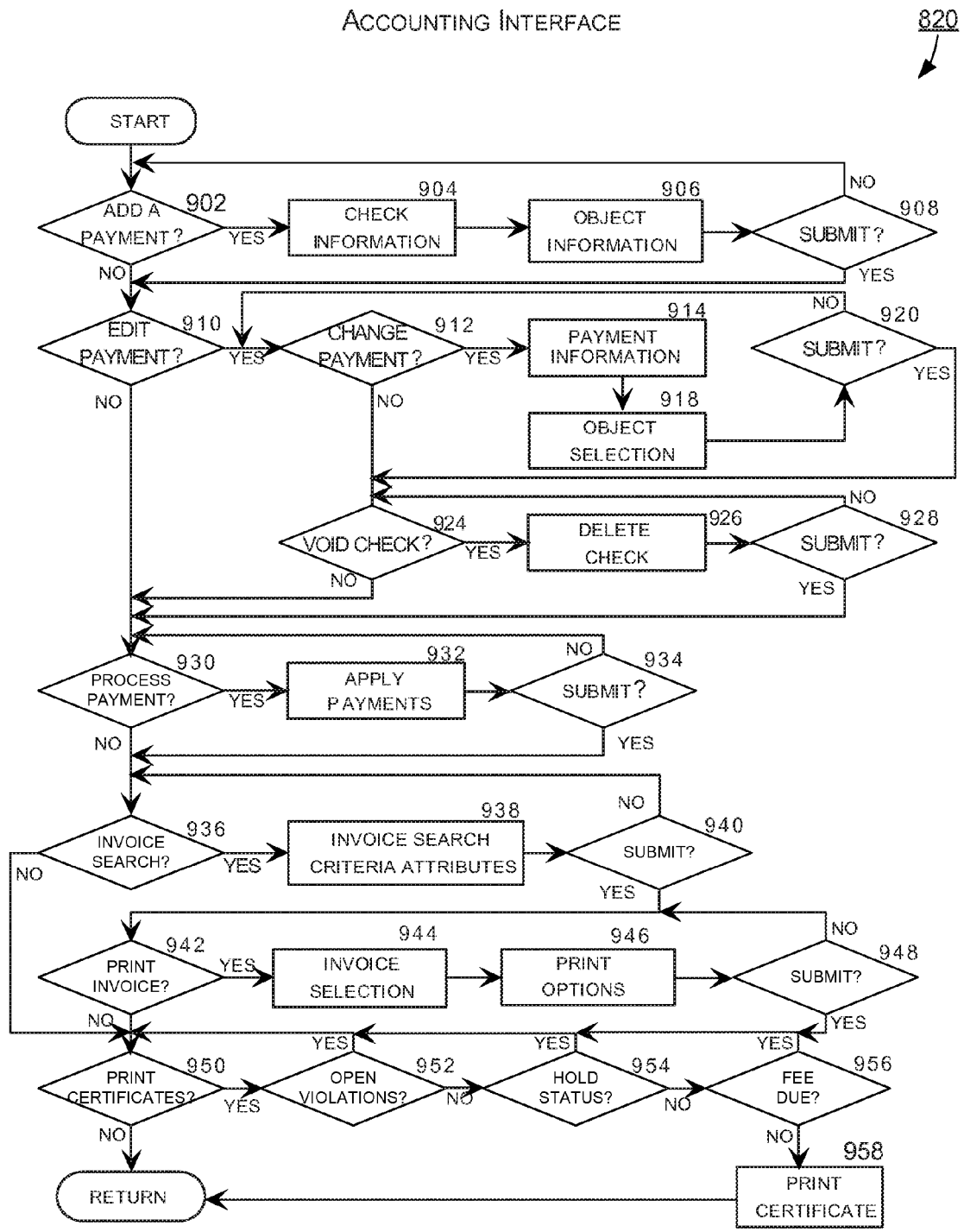
FIG. 9 is a flow diagram illustrating an accounting interface routine.

FIG. 9 illustrates an embodiment of an accounting interface routine 820. The routine 820 is accessed upon a user requesting accounting functions from step 815 of FIG. 8. The routine begins at step 902, in which the JOM determines if the user desires to add payment. If payment information is not to be added, the NO branch of step 902 is followed to step 910, in which the JOM determines if a payment is to be edited. If payment information is to be entered, the YES branch of step 902 is followed to step 904.

In step 904, the JOM accepts payment information. Payment information can include automatic bank withdrawal information, draft withdrawal information, or credit card information. Step 904 is followed by step 906, in which the user selects the objects to which the payment applies. Step 906 is followed by step 908, in which the user selects to submit the payment information. If the user decides not to submit the payment information, the NO branch of step 908 is followed to step 902, in the user determines if payment information is to be entered. If the payment information is submitted, the YES branch of step 908 is followed to step 910.

In step 910, the JOM determines if payment is to be edited. If payment information is not to be edited, the NO branch of step 910 is followed to step 930, in which the JOM determines if a payment is to be processed. If a payment is to be edited, the YES branch of step 910 is followed to step 912, in which the JOM determines if the user desires to change payment information. If payment information is not be changed, the NO branch of step 912 is followed to step 924, in which the JOM determines if a payment is to be deleted. If payment information is to be changed, the YES branch of step 912 is followed to step 914, in which the JOM displays and accepts edit payment information.

Step 914 is followed by step 918, in which the user can change the objects to which any payments are to be applied. Step 918 is followed by step 920, in which the JOM determines if the payment edit is to be submitted. If the payment edit is not to be submitted the NO branch of step 920 is followed to step 912, in which the JOM determines if the user desires to change payment information. If the payment information is to be submitted, the YES branch of step 920 is followed to step 924, in which the JOM determines is the payment, is to be deleted. If the payment is not to be deleted, the NO branch of step 924 is followed to step 930, in which the JOM determines if the user desires to process a payment. If a payment is to be voided, the YES branch of step 924 is followed to step 926, in which the user designates the payment to delete. Step 926 is followed by step 928, in which the JOM determines if the user submits the delete payment request. If the delete request is not submitted, the NO branch of step 928 is followed to step 924, in which the JOM determines if the user desires to delete a payment. If the user selects to submit a deletion, the YES branch of step 928 is followed to step 930.

In step 930, the JOM determines if the desires to process a payment. If the user does not desire to process a payment, the NO branch of step 930 is followed to step 936, in which the JOM determines if the user desires an invoice search. If the user desires to process a payment, the YES branch of step 930 is followed to step 932. In step 932, the JOM provides an accounting of the payment received and a listing of objects with their associated fees. The JOM enables the users to select the objects for which to apply payments and provides an accounting of monies left after payment. Step 932 is followed to step 934, in which the user selects to submit the applied payment. If the user does not select to submit the application, the NO branch of step 934 is followed to step 930, in which the user determines if payments are to be applied to an object. If the users select to submit the payment application, the YES branch of step 934 is followed to step 936 and the accounting information is updated.

In step 936, the JOM determines if the user desires an invoice search. If an invoice search is not to be performed, the NO branch of step 936 is followed to step 950, in which the JOM determines whether to print a certificate. If an invoice search is to be performed, the YES branch of step 936 is followed to step 938, in which the user enters the search criteria. Step 938 is followed by step 940, in which the JOM determines whether the search criterion is submitted. If the criterion is not to be submitted, the NO branch of step 940 is followed to step 936, in which the JOM determines whether an invoice search is to be performed. If the search criterion is submitted, the yes branch of step 940 is followed to step 942 and the search is performed with the results displayed.

In step 942, the JOM determines whether to print the invoice. If the invoice is not to be printed, the NO branch of step 942 is followed to step 950, in which the JOM determines whether to print a certificate. If the invoice is to be printed, the YES branch of step 942 is followed to step 944.

In step 944, the JOM accepts the user selection of the invoices displayed as a result of the submission of the invoice search. Step 944 is followed by step 946, in which the print option for the invoice is determined. Step 946 is followed by step 948, in which the JOM determines whether the print request is submitted. If the print request is not to be submitted, the NO branch of step 948 is followed to step 942, in which the JOM determines if an invoice is to be printed. If the print request is submitted, the YES branch of step 948 is followed to step 950.

In step 950, the JOM determines whether to print a certificate. If a certificate is not to be printed, the NO branch of step 950 is followed and the routine is returned to perform step 825 of FIG. 8. If a certificate is to be printed, the YES branch of step 950 is followed to step 952, in which the JOM determines if an open violation occurs for the object. If a lo violation is open, the YES branch of step 952 is followed to step and no certificate is printed. If an open violation does not exist, the NO branch of step 952 is followed to step 954. If step 954, if a hold status has been placed on the object, no certificate can be printed and YES branch is followed to step 950. If a hold status is not current, the NO branch of step 954 is followed to step 956, in which the JOM determines if fees are due. If the fees have not been paid, the Yes branch of step 956 is followed and the certificate cannot be printed. If the requisite fees have been paid, the NO branch of 956 is followed to step 958, in which the JOM generates and prints a certificate. After step 958, the routine is returned to perform step 825 of FIG. 8.

Figure 10:
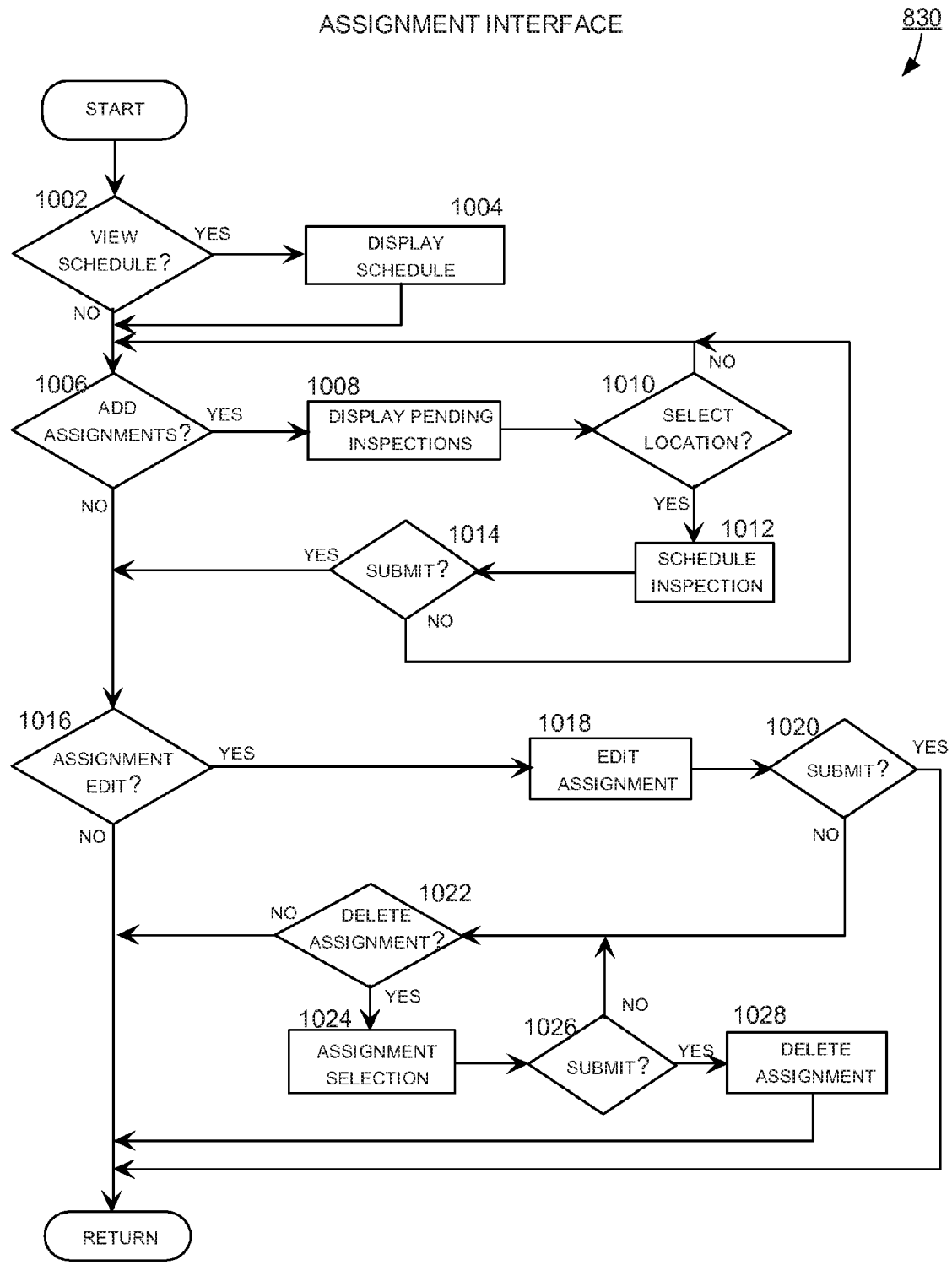
FIG. 10 is a flow diagram illustrating an assignment interface routine.

FIG. 10 illustrates an inspection assignment routine 830. The routine 830 is accessed upon a user requesting assignment functions from step 825 of FIG. 8. The routine begins with step 1002, in which the JOM determines whether to display the work schedule. If the schedule is not to be displayed, the NO branch of step 1002 is followed to step 1006, in which the JOM determines whether new work assignments are to be added. If the schedule is to be viewed, the YES branch of step 1002 is followed to step 1004, in which the JOM displays the current scheduled inspections. Step 1004 is followed by step 1006.

In step 1006, the JOM determines if new assignments are to be added to the work assignment. If new work assignments are not to be scheduled, the NO branch of step 1006 is followed to step 1016, in which the JOM determines whether assignments are to be edited. If new assignments are to be scheduled, the YES branch of step 1006 is followed to step 1008. In step 1008, the current locations requiring inspections are displayed. Step 1008 is followed by step 1010, in which the JOM determines if the user has selected a location to inspect. If a location is not to be selected, the NO branch of step 1010 is followed to step 1006, in which the user determines whether to add an assignment. If a location is selected, the YES branch of step 1010 is followed to step 1012.

In step 1012, an inspection is slated to be performed. Step 1012 is followed by step 1014, in the user submits the added scheduled inspection. If the inspection is not to be scheduled, the NO branch of step 1014 is followed to 1006, in which the user determines whether to add an assignment. If the inspection is to be scheduled, the YES branch of step 1014 is followed to step 1016.

In step 1016, the JOM determines whether the schedule is to be edited. If not assignment edit is to be performed, the NO branch of step 1016 is followed and the routine is lo returned to perform step 835 of FIG. 8. If an assignment is to be edited, the YES branch of step 1016 is followed to step 1018.

In step 1018, the current schedule is edited by the user. Step 1018 is followed by step 1020, in which the JOM determines if the edit is to be submitted. If the edit is submitted, the YES branch of step 1020 is followed to perform step 835 of FIG. 8. If the edit is not submitted, the NO branch of step 1020 is followed to step 1022, in which the JOM determines whether an assignment is to be deleted. If no assignment is to be deleted, the NO branch of step 1022 is followed to perform step 835 of FIG. 8. If an assignment is to be deleted, the YES branch of step 1022 is followed to step 1024.

In step 1024, the user selects the assignments that are to be deleted from the work schedule. Step 1024 is followed by step 1026, in which the JOM determines if the selected assignments are submitted for deletion. If the assignments are not to be deleted, the NO branch of step 1026 is followed to step 1022, in which the user determines whether to delete an assignment. If the deletion is submitted, the YES branch of step 1026 is followed to step 1028. In step 1028, the assignment is deleted from the inspectors work schedule. Step 1028 is followed to return the routine to perform step 835 of FIG. 8.

Figure 11:
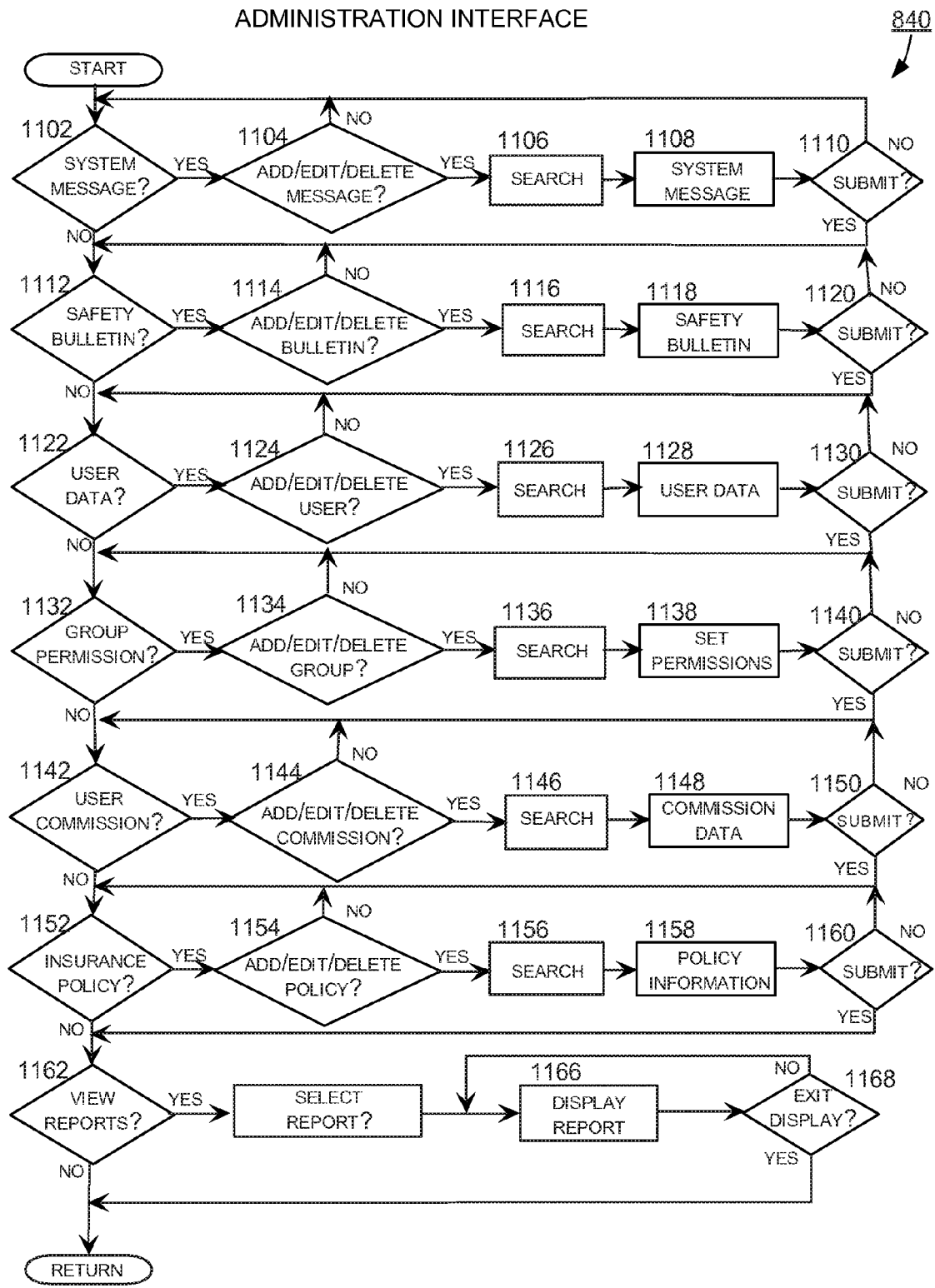
FIG. 11 is a flow diagram illustrating an administration interface routine.

FIG. 11 illustrates an embodiment of an administration routine 840. The routine 840 is accessed upon a user requesting administration functions from step 835 of FIG. 8. The routine 840 begins with step 1102, in which the JOM determines whether to administer a system message. If a system message is not to be affected, the NO branch of step 1102 is followed to step 1112, in which the IOM determines whether to administer a safety bulletin. If a system message is to be affected, the YES branch of step 1102 is followed to step 1104. In step 1104, the JOM determines if the message is to be added, edited, or deleted. If a message is not to be affected, the NO branch of step 1104 is followed to step 1102, in which the JOM determines whether a system message is to be administered. If a system message is to be affected, the YES branch of step 1104 is followed to step 1106.

In step 1106, a search is performed, if necessary, to find system message to be altered. Step 1106 is followed by step 1108, in which the system message is altered. Step 1108 is followed by step 1110, in which the JOM determines if the affected message is submitted. If the alteration is not submitted, the NO branch of step 1110 is followed to step 1102, in which the JOM determines if a system message is to be altered. If the alteration is submitted, the alteration is recorded and the YES branch of step 1110 is followed to step 1112.

In step 1112, the JOM determines whether to administer a safety bulletin. If a safety bulletin is not to be affected, the NO branch of step 1112 is followed to step 1122, in which the JOM determines whether to administer user data. If a safety bulletin is to be affected, the YES branch of step 1112 is followed to step 1114. In step 1114, the JOM determines if the bulletin is to be added, edited, or deleted. If a bulletin is not to be affected, the NO branch of step 1114 is followed to step 1112, in which the JOM determines whether a safety bulletin is to be administered. If a safety bulletin is to be affected, the YES branch of step 1114 is followed to step 1116.

In step 1116, a search is performed, if necessary, to find the safety bulletin to be altered. Step 1116 is followed by step 1118, in which the bulletin is altered. Step 1118 is followed by step 1120, in which the JOM determines if the affected bulletin is submitted. If the alteration is not submitted, the NO branch of step 1120 is followed to step 1112, in which the JOM determines if a safety bulletin is to be altered. If the alteration is submitted, the alteration is recorded and the YES branch of step 1120 is followed to step 1122.

In step 1122, the JOM determines whether to administer user data. If user data is not to be affected, the NO branch of step 1122 is followed to step 1132, in which the JOM determines whether to administer group permissions. If user data is to be affected, the YES branch of step 1122 is followed to step 1124. In step 1124, the JOM determines if the user data is to be added, edited, or deleted. If a user is not to be affected, the NO branch of step 1124 is followed to step 1122, in which the JOM determines whether user data is to be administered. If a user is to be affected, the YES branch of step 1124 is followed to step 1126.

In step 1126, a search is performed, if necessary, to find the user data to be altered. Step 1126 is followed by step 1128, in which the user data is altered. Step 1128 is followed by step 1130, in which the JOM determines if the user data is to be submitted. If the user data is not submitted, the NO branch of step 1130 is followed to step 1122, in which the JOM determines if user data is to be altered. If the alteration is submitted, the alteration is recorded the YES branch of step 1130 is followed to step 1132.

In step 1132, the JOM determines whether to administer group permissions. If group permission is not to be affected, the NO branch of step 1132 is followed to step 1142, in which the JOM determines whether to administer user commissions. If group permission is to be affected, the YES branch of step 1132 is followed to step 1134. In step 1134, the JOM determines if the group permission is to be added, edited, or deleted. If group permission is not to be affected, the NO branch of step 1134 is followed to step 1132, in which the JOM determines whether group permission is to be administered. If group permission is to be affected, the YES branch of step 1134 is followed to step 1136.

In step 1136, a search is performed, if necessary, to find the user to be altered. Step 1136 is followed by step 1138, in which the group permission is altered. Step 1138 is followed by step 1140, in which the JOM determines if the group permission is to be submitted. If the group permission is not submitted, the NO branch of step 1140 is followed to step 1132, in which the JOM determines if group permission is to be altered. If the alteration is submitted, the alteration is recorded the YES branch of step 1140 is followed to step 1142.

In step 1142, the JOM determines whether to administer commissions. If a commission is not to be affected, the NO branch of step 1142 is followed to step 1144, in which the JOM determines whether to administer user commissions. If a commission is to be affected, the YES branch of step 1142 is followed to step 1144. In step 1144, the JOM determines if a commission is to be added, edited, or deleted. If a commission is not to be affected, the NO branch of step 1144 is followed to step 1142, in which the JOM determines whether a commission is to be administered. If a commission is to be affected, the YES branch of step 1144 is followed to step 1146.

In step 1146, a search is performed, if necessary, to find the user to be altered. Step 1146 is followed by step 1148, in which a commission is altered. Step 1148 is followed by step 1150, in which the JOM determines if a commission is to be submitted. If a commission is not submitted, the NO branch of step 1150 is followed to step 1142, in which the JOM determines if a commission is to be altered. If the alteration is submitted, the alteration is recorded the YES branch of step 1150 is followed to step 1152.

In step 1152, the JOM determines whether to administer an insurance policy. If an insurance policy is not to be affected, the NO branch of step 1152 is followed to step 1162, in which the JOM determines whether to administer a report. If an insurance policy is to be affected, the YES branch of step 1152 is followed to step 1154. In step 1154, the JOM determines if an insurance policy is to be added, edited, or deleted. If an insurance policy is not to be affected, the NO branch of step 1154 is followed to step 1152, in which the JOM determines whether an insurance policy is to be administered. If an insurance policy is to be affected, the YES branch of step 1154 is followed to step 1156.

In step 1156, a search is performed, if necessary, to find the object to be altered. Step 1156 is followed by step 1158, in which an insurance policy is altered. Step 1158 is followed by step 1160, in which the JOM determines if an insurance policy is to be submitted. If an insurance policy is not submitted, the NO branch of step 1160 is followed to step 1152, in which the JOM determines if an insurance policy is to be altered. If the alteration is submitted, the alteration is recorded the YES branch of step 1160 is followed to step 1162.

In step 1162, the JOM determines whether to display reports. If a report is not to be displayed, the NO branch of step 1162 is followed and the routine is returned to perform step 845 of FIG. 8. If a report is to be viewed, the YES branch of step 1162 is followed to step 1164. In step 1164, the viewer selects the report type to be viewed. Step 1164 is followed by step 1666, in which the JOM displays the requested reports. Step 1166 is followed by step 1168, in the JOM determines whether to exit the report display. If the report display is not exited, the NO branch of step 168 is followed to step 166 and the selected reports are continued to be displayed. If the user requests to exit the report display, the YES branch of step 1168 is followed and routine is returned to perform step 845 of FIG. 8.

Figure 12:
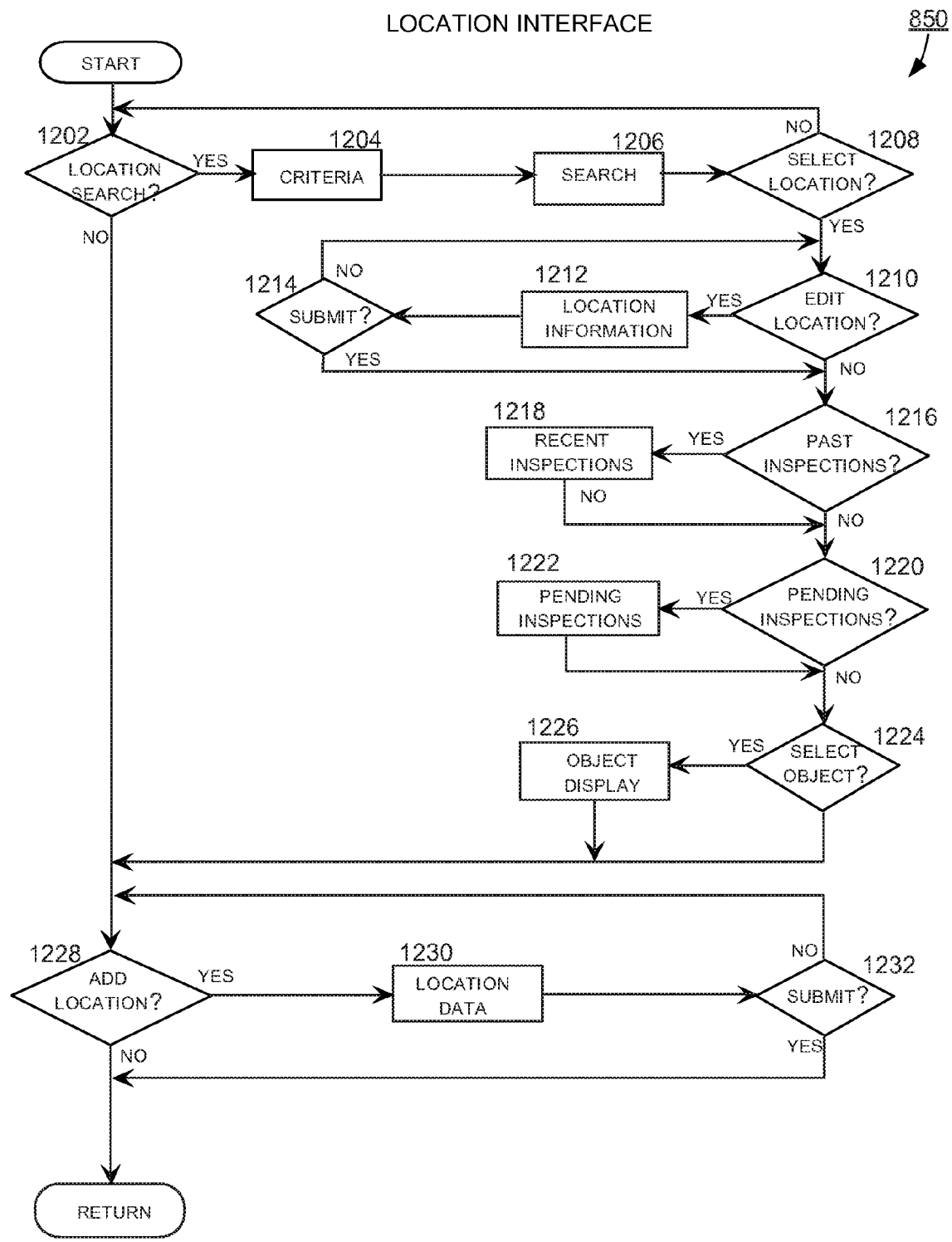
FIG. 12 is a flow diagram illustrating a location interface routine.

FIG. 12 illustrates an embodiment of a location interface routine 850. The routine 850 is accessed upon a user requesting location functions from step 845 of FIG. 8. Routine 850 begins with step 1202, in which the JOM determines whether a location search is to be performed. If a location search is not to be performed, the NO branch of step 1202 is followed by step 1228, in which the JOM determines if the user is adding a location. If a location search is to be performed, the YES branch of step 1202 is followed to step 2204.

In step 1204, the JOM accepts the search criteria inputted by the user. Step 1204 is followed by step 1206, in which the JOM performs the search and display the results. Step 1206 is followed by step 1208, in which the JOM determines if a location is to be selected. If a location is not to be selected, the NO branch of step 1208 is followed to step 1202, in which the JOM determines whether to perform a location search. If a Location is selected, the YES branch of step 1208 is followed to step 1210.

In step 1210, the JOM determines if a location edit is to be performed. If location data is not to be edited, the NO branch of step 1210 is followed to step 1216, in which the JOM determines if past inspections are to be accessed. If a location edit is to be performed, the YES branch of step 1210 is followed to 1212. In step 1212, the JOM accepts updated location information.

Step 1212 is followed by step 1214, in which the JOM determines if the edited lo location data is to be submitted. If the location edit is not to be submitted, the NO branch of step 1214 is followed to step 1210, in which a determination is made whether to edit location information. If the location edit is submitted, the JOM stores the update and the YES branch of step 1214 is followed to step 1216.

In step 1216, a determination of whether to access past inspections. If past inspections are not to be accessed, the NO branch of step 1216 is followed to step 1220, in which the JOM determines if pending inspections are to be accessed. If past inspections are to be accessed, the YES branch of step 1216 is followed to step 1218.

In step 1218, recent inspections are displayed for access by the user. User interaction with inspection functions is described in greater detail in reference to FIG. 14. Step 1218 is followed by step 1220, in which a determination is made whether to access pending inspections.

In step 1220, a determination of whether to access pending inspections. If pending inspection are not to be performed, the NO branch of step 1220 is followed to step 1224, in which the JOM determines if an object is to be selected. If pending inspections are to be accessed, the YES branch of step 1220 is followed to step 1222. In step 1222, pending inspections are displayed for access by the user. User interaction with assignment functions is described in greater detail in reference to FIG. 10. Step 1222 is followed by step 1224.

In step 1224, a determination is made whether to access object functions. If object functions are not to be accessed, the NO branch of step 1224 is followed by step 1228, in which the JOM determines whether a new location information is to be added. If object functions are to be accessed, the YES branch of step 1224 is followed by step 1226, in which the location objects are displayed for further interaction. Interaction with objects is described in greater detail in reference to FIG. 13. Step 1226 is followed by step 1228.

In step 1228, the JOM decides whether to add a location. If a new location is not to be added, the NO branch is followed and the routine 850 is returned to perform step 855 of FIG. 8. If a new location is to be added, the YES branch of step 1228 is followed to step 1230. In step 1230, new location data is inputted by the user. Step 1230 is followed by step 1232, in which a determination is made whether to submit the new location data. If the new location data is not to be submitted, the NO branch of step 1232 is followed to step 1228, in which a determination is made whether to add a new location. If new location data is to be submitted, the YES branch of step 1232 is followed and the routine 850 is returned to perform step 855 of FIG. 8.

Figure 13:
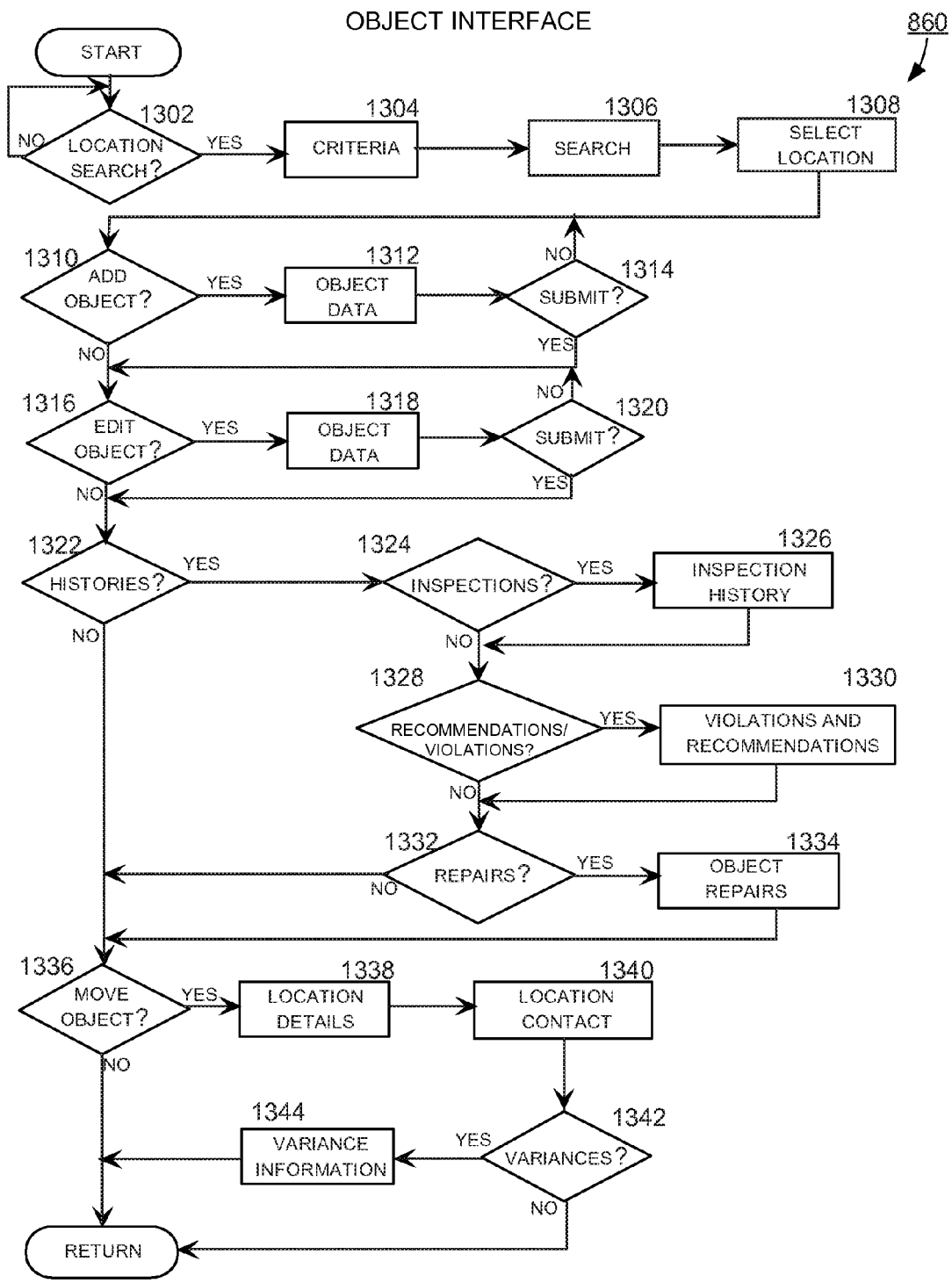
FIG. 13 is a flow diagram illustrating an object interface routine.

FIG. 13 illustrates an embodiment of a object interface routine 860. The routine 860 is accessed upon a user requesting object functions from step 855 of FIG. 8. Routine 860 begins with step 1302, in which the JOM determines whether a location search is to be performed. If a location search is not to be performed, the NO branch of step 1302 is followed to step 1302, in which the JOM determines if location search is to be performed. If a location search is to be performed, the YES branch of step 1302 is followed to step 1304.

In step 1304, the location search screen is displayed and the criterion is entered. Step 1304 is followed by step 1306 the location search is performed. Step 1306 is followed by step 1308, in which the location of the object is selected. Step 1308 is followed by step 1310, in which a determination is made whether to add an object. If an object is not to be added the NO branch of step 1310 is followed by step 1316, in which a determination is made whether to edit object information. If an object is to added, the YES branch of step 1310 is followed to step 1312.

In step 1312, the new object information is inputted by the user. Step 1312 is followed by step 1314, in which a determination is made whether to submit the new information. If the addition is not to be submitted, the NO branch of step 1314 is followed to step 1310, in which a determination is made whether to add an object. If the new object information is to be submitted, the YES branch of step 1314 is followed to step 1316.

In step 1316, a determination is made whether object information is to be edited. If an object is not to be edited, the NO branch of step 1316 is followed to 1322, in which a determination is made whether to display object history. If object information is to edited the YES branch of step 1316 is followed to step 1318, in which the object data is edited. Step 1318 is followed by step 1320, in which a determination is made whether to submitted the edit. If the edit is not to be submitted, the NO branch of step 1320 is followed to step 1316, in which a determination is made whether to edit an object. If the object edit is to be submitted, the Yes branch of step 1320 is followed to step 1322.

In step 1322, a determination is made whether to access the object history. If the object history is not to be displayed, the NO branch of step 1322 is followed to step 1336, in which a determination is made whether to update object information caused by the movement of the object's location. If the object has not been moved, the NO branch of step 1336 is followed and routine 860 is returned to perform step 865 of FIG. 8. If the object has been moved, the YES branch of step 1336 is followed to step 1338, in which the new location information is inputted. Step 1338 is followed by step 1340, in which the contact information for the new location is entered. Step 1340 is followed by step 1342.

In step 1342, a determination is made whether to enter variation information. If a variation is not required, the NO branch of step 1342 is followed and the routine 860 is returned to perform step 865 of FIG. 8. If variation information is to be entered, the YES branch of step 1342 is followed to step 1344. In step 1344, the variations approved by the is jurisdiction are entered. After step 1344, the routine 860 is returned to perform step 865 of FIG. 8.

Figure 14:
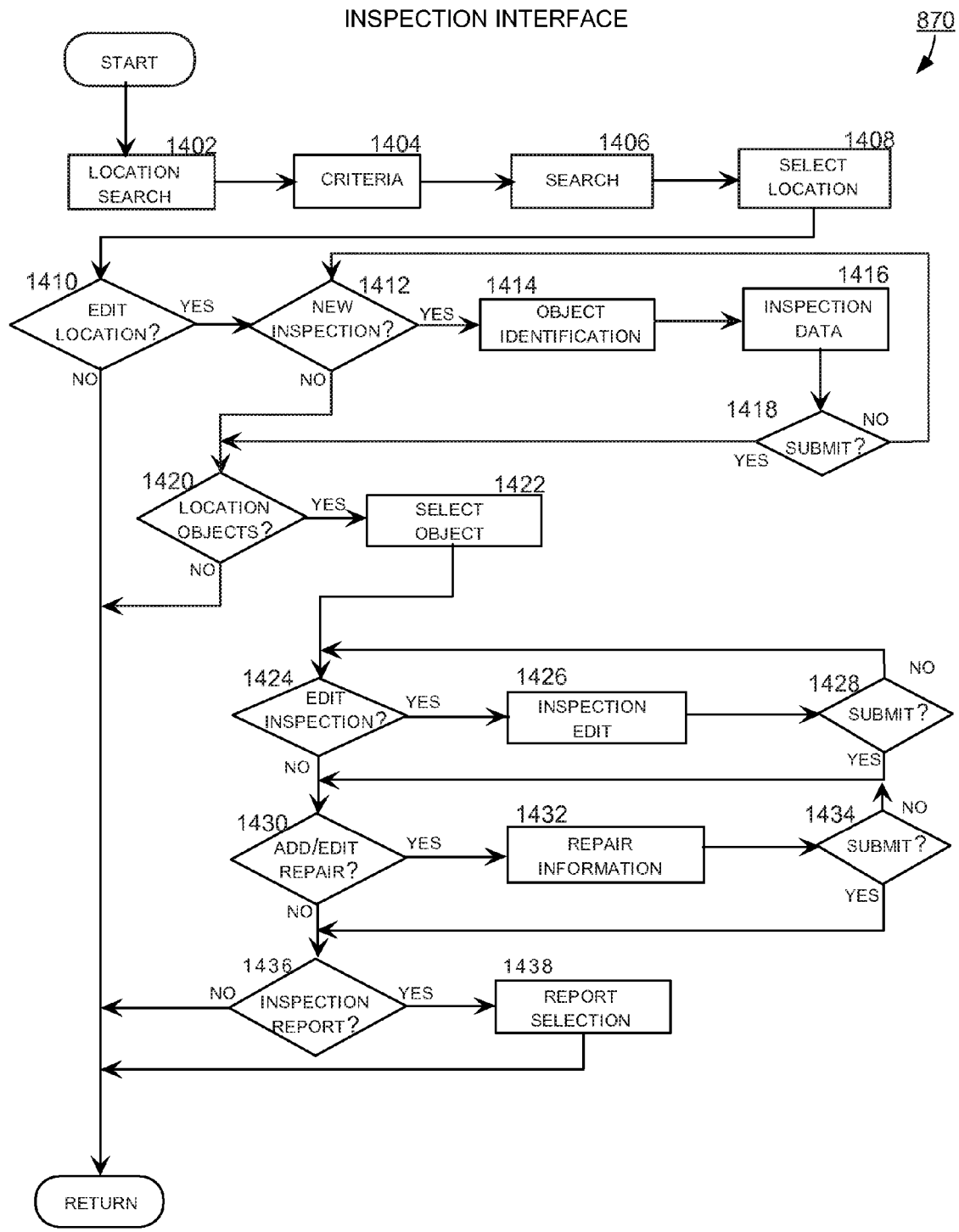
FIG. 14 is a flow diagram illustrating an inspection interface routine.

FIG. 14 illustrates an embodiment of a inspection interface routine 870. The routine 870 is accessed upon a user requesting location functions from step 845 of FIG. 8. Routine 850 begins with step 1202, in which the JOM determines that a location search is to be performed. Step 1402 is followed by step 1404, in which the location search criteria is entered. Step 1404 is followed by step 1406, in which the search is performed and the results are displayed. Step 1406, is followed by step 1408, in which the desired location is selected.

Step 1408 is followed by step 1410, in which a determination is made whether to access the edit location functions. If edit location functions are not to be accessed, the NO branch of step 1410 is followed and the routine 870 is returned to perform step 875 of FIG. 8. If edit location functions are to be entered, the YES branch of step 1410 is followed to step 1412, in which a determination is made whether to enter a new inspection information.

If new inspection information is not to be entered, the NO branch of step 1412 is followed to step 1420, in which the object functions are accessed. If new inspection information is to be entered, the YES branch of step 1412 is followed to step 1414. In step 1414, the user selects the appropriate object at that location. Step 1414 is followed by step 1416, the inspection entry screen is displayed and the inspection data is entered. Step 1416 is followed by step 1418, in which a determination is made to submit the inspection. If the inspection is not to be submitted, the NO branch of step 1418 is followed to step 1412, in which a determination is made whether to enter a new inspection. If the new inspection information is submitted, the YES branch of step 1418 is followed to step 1420.

In step 1420, the JOM determines if the object functions are to be accessed. If the object functions are not to be accessed, the NO branch of step 1420 is followed and the routine 870 is returned to perform step 875 of FIG. 8. If the object functions are to be accessed, the YES branch of step 1420 is followed by step 1422, in which the user selects the appropriate object.

Step 1422 is followed by step 1424, in which a determination is made whether to edit an inspection. If an inspection is not to be edited, the NO branch of step 1424 is followed to step 1430, in which a determination is made whether to add or edit a repair information. If an inspection is to be edited, the YES branch of step 1424 is followed to step 1426, in which the inspection information is entered.

Step 1426 is followed by step 1428, in which a determination is made whether to submit the edit. If the edit is not to be submitted, the NO branch of step 1428 is followed to step 1424, in which a determination is made whether to edit an inspection. If the edit is to be submitted, the YES branch of step 1428 is followed to step 1430.

In step 1430, a determination is made whether to add or edit repair information. If repair information is not to be updated, the NO branch of step 1430 is followed to step 1436, in which a determination is made whether to access inspection reports. If repair information is to be updated, the YES branch of step 1430 is followed to step 1432, in which the repair information is entered.

Step 1432 is followed by step 1434, in which a determination is made whether to submit the update. If the update is not to be submitted, the NO branch of step 1434 is followed to step 1430, in which a determination is made whether to update repair information. If the update is to be submitted, the YES branch of step 1434 is followed to step 1436.

In step 1436, a determination is made whether to access inspection reports. If inspection reports are not to be accessed, the NO branch of step 1436 is followed and the routine 870 is returned to perform step 875 of FIG. 8. If reports are to be accessed, the YES branch of step 1436 is followed to step 1438, in which the available reports are listed for selection. After step 1438, the routine 870 is returned to perform step 875 of FIG. 8.

Figure 15:
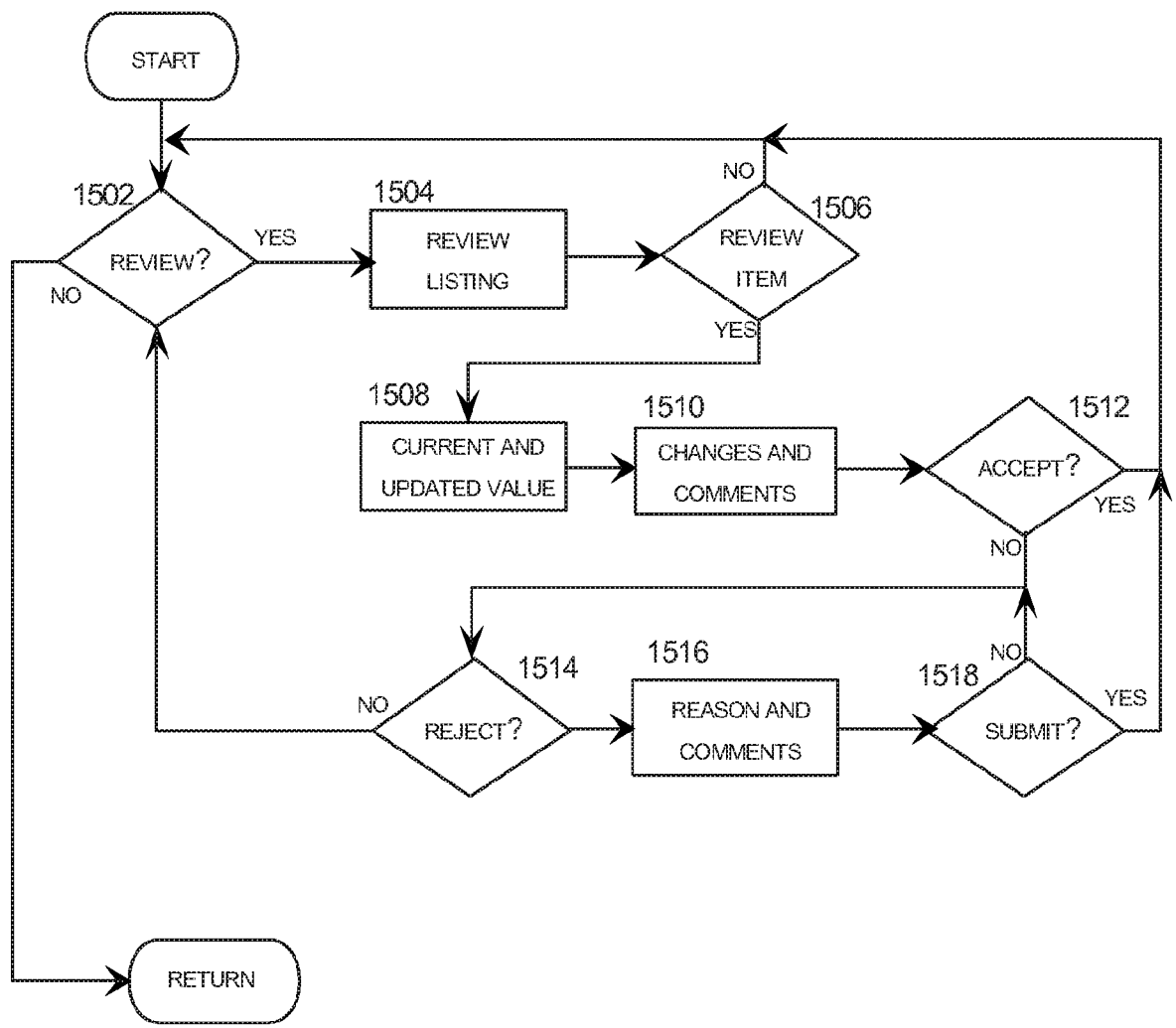
FIG. 15 is a flow diagram illustrating a review interface routine.

FIG. 15 illustrates an embodiment of a review interface routine 880. The routine 880 is accessed upon a user requesting review functions from step 875 of FIG. 8. Reviews to be performed for a jurisdiction are listed in the task listing for that jurisdiction. Routine 880 begins with step 1502, in which the JOM determines that a review is to be performed.

If a review is not to be performed, the NO branch of step 1502 is followed and the routine 880 is returned to perform step 885 of FIG. 8. If a review is selected, the YES branch of step 1502 is followed to step 1504. In step 1504, the JOM lists the items requiring review. Inspections, repairs, and some edits of object information require jurisdictional reviews. Step 1504 is followed by step 1506.

In step 1506, a determination is made of the review item to be accessed. If no review item is to be accessed, the NO branch of step 1506 is followed to step 1502, in which a determination is made whether to perform a review. If a review is to be accessed, the reviewer selects the item and the YES branch of step 1506 is followed to step 1508.

In step 1508, the review information is displayed. The display lists the current data and displays the old information for those items that have been edited. The display of the pervious information assists the reviewer with the performance of the review. Step 1508 is followed by step 1510, in which the review performs the review and enters comments.

Step 1510 is followed by step 1512, in which a determination is made whether to accept the inspection or update. If the item is accepted, the YES branch of 1512 is followed to step 1502, in which a determination is made whether to perform another review. If the item is not accepted, the NO branch of 1512 is followed to step 1514, in which a determination is made whether to reject the item.

If the item is not to be rejected, the NO branch of step 1514 is followed to step 1502, and a determination is made whether to perform a review. If the item is to be rejected, the YES branch of step 1514 is followed to step 1516. In step 1516, the review is complete and the reason for rejection is entered. Step 1516 is followed by step 1518, in which a determination is made whether to submit the rejection. If the rejection is not to be submitted, the NO branch of step 1518 is followed to step 1514, in which a determination is made whether the item is to be rejected. If the rejection is to be submitted, the YES branch of step 1518 is followed to step 1502, in which determinations are made whether perform another review.

Figure 16:
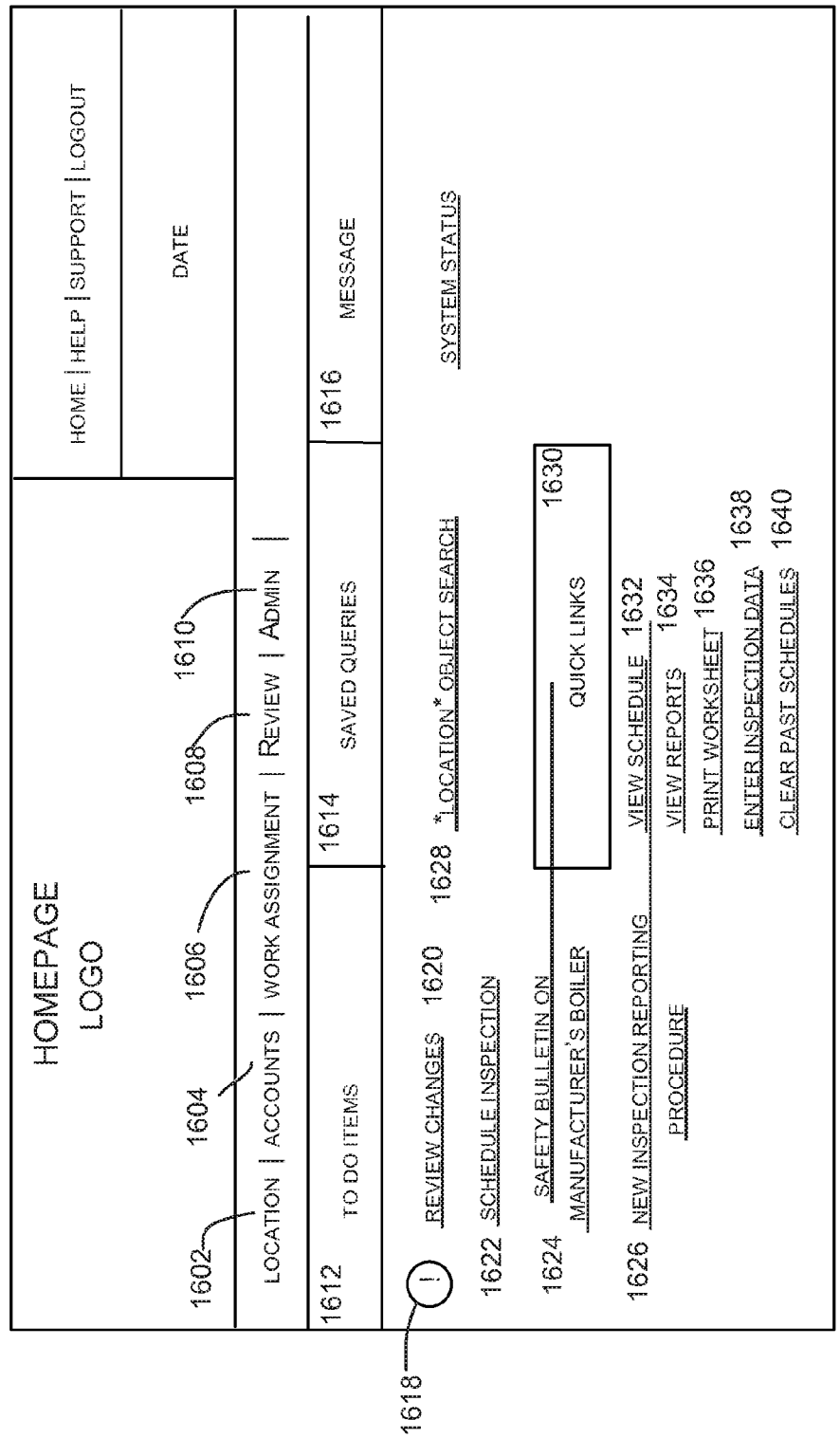
FIG. 16 is a screen shot illustrating a user homepage.

FIG. 16 illustrates a screen shot of a homepage 1600 generated by the JOM. The homepage 1600 has hot links to the location unit 1602, account unit 1604, assignment unit 1606, review unit 1608, and an admin unit 1610. The functional units are described in greater detail in reference to FIG. 4. The homepage 1600 has a task listing 1612 listing tasks needed to be performed. An task marked with a circled exclamation point 1618 signals a task that has overdue items. The task listing 1612 has a review changes hot link 1620 to the reviews needing to be performed. In the illustrated task listing 1612, the review changes task 1620 has reviews that are overdue for being reviewed.

The task listing 1612 also has a schedule inspection hot link 1622. This hot link 1622 would cause the generation and display of the schedule inspection web page. The illustrated homepage 1612 also lists a safety bulletin 1624 on boilers for perusal. In addition, the task listing 1612 has a new inspection reporting procedure posted for viewing. Posting of safety bulletins or other informational bulletins is accomplished by the administration unit. The administration unit can be quickly accessed by the admin hot link 1610.

The homepage 1600 also has a saved queries listing 1628. In the illustrated homepage 1600, an object search hotlink 1628 is listed for a selected location. This hotlink 1628 provides a quick link to this previously performed search. In addition, a message listing 1616 provides access to system message and system status.

Additionally, the homepage 1600 has a listing of several quick links 1630. A quick link to schedules 1632, reports 1634, printing of worksheets 1636, inspection performance 1638, and clearance past schedules. These quick links 1630 enable the user to directly generate and display the associated web pages.

FIG. 17 illustrates a screen shot of a location web page 1700. The location web page 1700 has a location details button 1710. The location details web page enables the user to enter location information. Location details stored in the JOM database is discussed in greater detail in reference to FIG. 7. In addition, the location web page 1700 has a contact details button 1720. The contact details web page enables the user to enter contact information. Contact details stored in the JOM database is discussed in greater detail in reference to FIG. 7. Additionally, the location web page 1700 has a button 1760 to access previous recommendations and violations at the location.

The location web page 1700 also has an object button 1740. Activating the object button 1740 causes the presentment of object display options 1740. The illustrated display option 1740 is by object type. In this case, all objects are presented namely three firetube boilers. Each object has a button 1750 that upon activation will provide the object history. Each history line has an associated button 1755 that links the user to the associated web page to view or edit the item.

FIG. 18 illustrates a screen shot of an object web page 1800. The web page 1800 provides an easy mechanism for the user to enter or edit object details 1810 by the operation of a web browser. The web page 1800 displays the date of last inspection. The illustrated object details 1810 is for a boiler.

Typical object details 1810 includes the jurisdiction number for the object as well as another object number such as the one assigned by the manufacturer. Detail information 1810 such as the location within the plant, year installed, the manufacturer, the year built, lo use, and other general information is entered. Heating information such as the fuel type, method of fire, input, heating surface, and capacity are requested as boiler information. In addition safety information is entered such as the number of safety valves, the capacity provided, the maximum allowable working pressure (MAWP), and installation of a low water cutoff (LWCO). Some of the input boxes have drop down button for selection such as the fuel type. The illustrated fuel type for this illustrated boiler is gas.

The object web page 1800 has an inspection history button 1820 that will display the inspection history of the object. In addition, a listing of past recommendation and violations is accessed by associated button 1840. Additionally, object repairs can be accessed from the listing of the repairs for the object by the object repairs button 1830.

The entered information on the object web page can be saved by activation of the submit button 1862. The reset button 1862 provides a blank page for entry. The cancel button 1864 returns the user to the location web page illustrated in FIG. 17. The delete button 1864 will cause the object not to be listed at the location.

Figure 19:
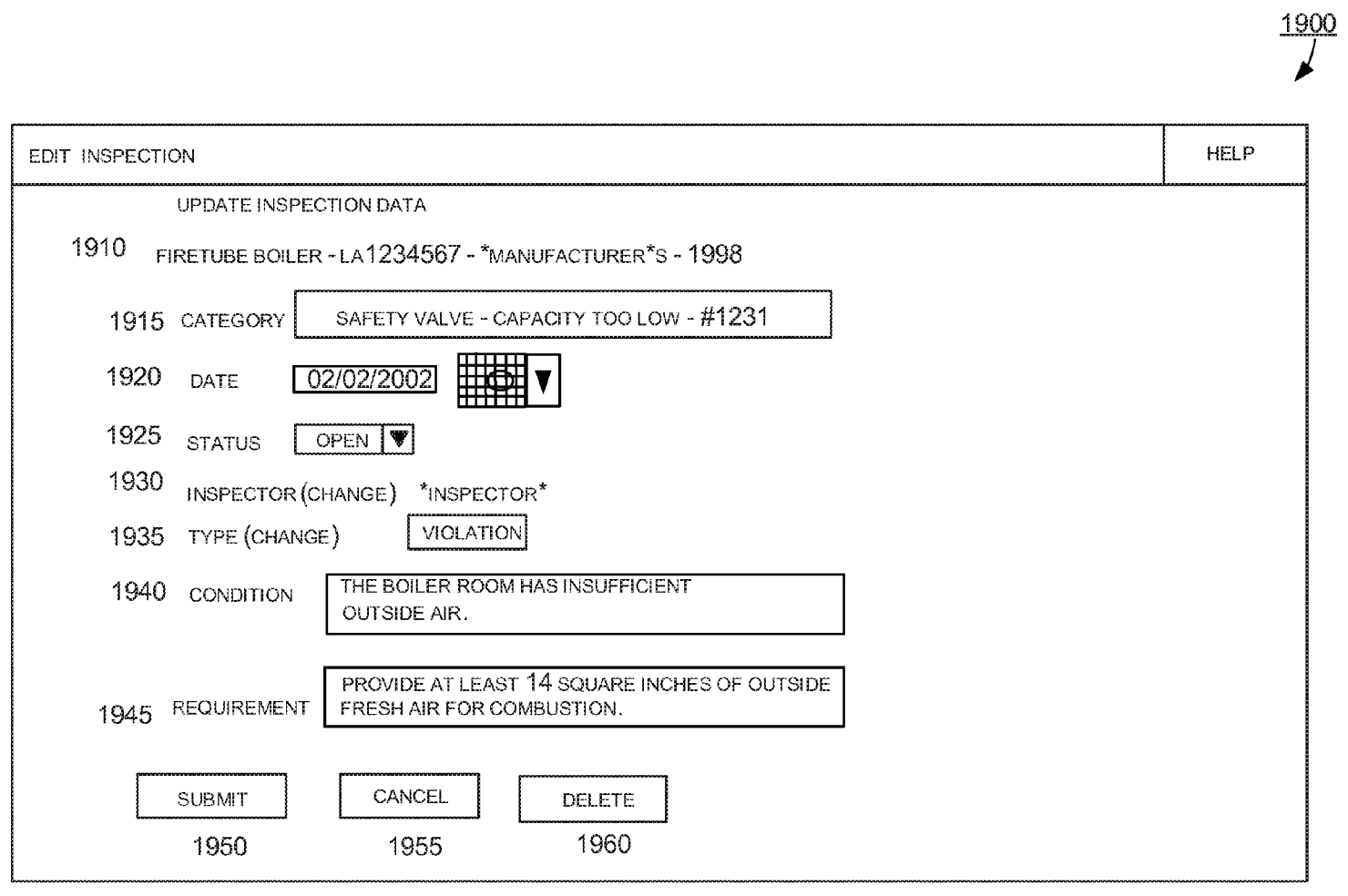

FIG. 19 illustrates a screen shot of an inspection web page 1900. The inspection web page 1900 allows an inspector to enter or edit inspection data. The inspection web page 1900 displays the basic object information 1910 associated with the inspection. This object information typically is the object type, the jurisdiction number, the manufacturer, and the year the object was built. The inspection web page 1900 has a pull down box 1915 with a listing of the categories of problems. In the illustrated inspection web page 1900, the violation is that the capacity is too low for the safety valve. A date entry box 1915 is provided along with a pop up calendar to easy date selection. The inspection status box 1925 indicates the current status of the problem such as open or closed. The inspector's name 1930 is automatically generated by the user information. The type field 1935 lists the problem type such as a violation or recommendation. The condition comment field accepts text for the description of the problem. Likewise, the requirement field accepts text for a description of the jurisdiction's requirement.

The inspector can submit and store the completed inspection by activation of the submit button 1950. The cancel button returns the user to the previous web page without storing any information. In addition, the delete button allows for the inspection to deleted, if the user has the permission.

FIG. 20 illustrates a screenshot of a review web page 2000. The review page 2000 lists the open reviews needing performance. Column 2010 provides links to perform the review. Column 2020 lists the date of that the action was performed. Column 2030 lists the type of review required. The review can be change of location or object information, as well as the review of an inspection. A description column 2040 provides a summary of the review item. In addition column 2050 will list the submitter of review.

FIG. 21 illustrates a screen shot of a review object web page 2100. The web page is 2100 has a button 2110 to review object edit. In the illustrated screen shot, the object edit for review is a boiler. The web page 2100 lists the current values in column 2140. The web page also displays an old value column 2150 for those values that have changed. For example, the date of last inspection has been updated. The web page also has owner details button 2120 and a comment field 2130. The reviewer can accept the update by activation of the accept button 2160 or reject the update by activation of the reject button 2180. The reset button 2180 resets the screen.

In view of the foregoing, it will be appreciated that the invention provides for a jurisdiction online manager. It should be understood that the foregoing relates only to the exemplary embodiments of the present invention, and that numerous changes may be made therein without departing from the spirit and scope of the invention as defined by the following claims. Accordingly, it is the claims set forth below, and not merely the foregoing illustration, which are intended to define the exclusive rights of the invention.

The invention claimed is:

1. A method for sharing information regarding a particular object of a type of regulated objects that are inspectable, between a jurisdictional entity having a jurisdiction over that type of regulated objects and a nonjurisdictional entity, comprising the steps of:

storing, in a computer database, information required by the jurisdictional entity relating to compliance requirements of the jurisdictional entity for regulation of regulated objects of that particular type of object;

storing, in the computer database, initial object information relating to the particular object applicable to the object as one of the regulated objects of that particular type of object, as stored object information;

providing remote access to the stored initial object information by a person associated with the jurisdictional entity and by a person associated with the nonjurisdictional entity;

receiving and storing, in the computer database, additional object information input by a person associated with the nonjurisdictional entity applicable to the particular object relating to inspection of the particular object by a person;

allowing online review and approval of the initial object information and the additional object information by a person associated with the jurisdictional entity, based on the stored information relating to compliance requirements of the jurisdictional entity;

receiving and storing, in the computer database, approval information generated from approval of the initial object information and additional object information as complying with the compliance requirements of the jurisdictional entity, by the person associated with the jurisdictional entity; and in response to receipt of the approval information, issuing a certificate of compliance for the particular object.

2. The method of claim 1, wherein the additional object information comprises inspection data resulting from inspection of the particular object.

3. The method of claim 1, further comprising the steps of:

arranging for inspection of the particular object by the nonjurisdictional entity; and storing inspection data resulting from the inspection as additional object information.

4. The method of claim 1, further comprising the step of:

scheduling an inspection for the particular object.

5. The method of claim 1, wherein the jurisdictional entity is a governmental regulatory agency.

6. The method of claim 1, wherein the nonjurisdictional entity is selected from the group comprising an inspection entity, an insurance company, and/or the owner of the object.

7. The method of claim 1, wherein information required by the jurisdictional entity for regulation of regulated objects of that particular type of object is expressed in a template associated with the jurisdictional entity.

8. The method of claim 1, wherein the remote access to the stored object information is effected via the Internet.

9. The method of claim 1, wherein the remote access to the stored object information is allowed only to an authorized person associated with the jurisdictional entity and an authorized person associated with the nonjurisdictional entity.

10. The method of claim 9, wherein the authorized person is a commissioned inspector.

11. The method of claim 1, wherein the regulated objects are physically inspectable objects.

12. The method of claim 11, wherein the physically inspectable objects are selected from the group: pressure vessels, boilers, elevators, and amusement park rides.

13. The method of claim 1, wherein the method is effected on a computer system that manages online review and approval of object information for a plurality of different jurisdictional entities.

14. The method of claim 1, wherein the jurisdictional entity is a governmental inspection entity.

15. The method of claim 1, wherein the nonjurisdictional entity is a non-governmental inspection entity.

16. The method of claim 1, wherein the method is carried out for plurality of regulated objects involving a plurality of jurisdictional entities.

17. The method of claim 1, wherein the information regarding the particular regulated object is shared between the jurisdictional entity and a plurality of nonjurisdictional entities.

18. The system of claim 1, wherein the person inspecting the particular object is associated with the nonjurisdictional entity.

19. The system of claim 1, wherein the person inspecting the particular object is associated with the jurisdictional entity.

20. A system for sharing information regarding a particular object of a type of regulated objects that are inspectable, between a jurisdictional entity having a jurisdiction over regulated objects of that type of objects and a nonjurisdictional entity, comprising:

a data network component for coupling to a global communication network for communicating on-line with a computer system of a jurisdictional entity and at least one nonjurisdictional entity;

a server computer coupled to the data network component including a database and operative for running application programs that contain application program logic for:

storing regulation information required by the jurisdictional entity relating to compliance requirements of the jurisdictional entity for regulation of regulated objects of that particular type of object;

storing initial object information relating to the particular object applicable to the object as one of the regulated objects of that particular type of object, as stored object information;

providing remote access to the stored initial object information by a person associated with the jurisdictional entity and by a person associated with a nonjurisdictional entity;

receiving and storing additional object information input by a person associated with the nonjurisdictional entity applicable to the particular object relating to inspection of the particular object by a person; and allowing online review and approval of the initial object information and the additional object information by a person associated with the jurisdictional entity based on the stored regulation information; relating to compliance requirements of the jurisdictional entity; and in response to receipt of approval indication information resulting from approval of the initial object information and additional object information as complying with the compliance requirements of the jurisdictional entity, by the person associated with the jurisdictional entity, issuing a certificate of compliance for the particular object; and a data storage system coupled to the server computer for storing application program data, regulation information, stored object information, initial object information and additional object information, and approval indication information.

21. The system of claim 20, wherein the server computer further comprises application programming logic for scheduling inspection for the particular object by a person.

22. The system of claim 20, wherein the jurisdictional entity is a governmental regulatory agency.

23. The system of claim 20, wherein the nonjurisdictional entity is selected from the group comprising an inspection entity, an insurance company, and/or the owner of the object.

24. The system of claim 20, wherein information required by the jurisdictional entity for regulation of regulated objects of that particular type of object is expressed in a template associated with the jurisdictional entity.

25. The system of claim 20, wherein the remote access to the stored object information is effected via the Internet.

26. The system of claim 20, wherein the remote access to the stored object information is allowed only to an authorized person associated with the jurisdictional entity and an authorized person associated with the nonjurisdictional entity.

27. The system of claim 26, wherein the authorized person is a commissioned inspector.

28. The system of claim 20, wherein the regulated objects are physically inspectable objects.

29. The system of claim 28, wherein the physically inspectable objects are selected from the group: pressure vessels, boilers, elevators, and amusement park rides.

30. The system of claim 20, wherein the system manages online review and approval of object information for a plurality of different jurisdictional entities.

31. The system of claim 20, wherein the jurisdictional entity is a governmental inspection entity.

32. The system of claim 20, wherein the nonjurisdictional entity is a non-governmental inspection entity.

33. The system of claim 20, wherein the system is operative in connection with a plurality of regulated objects involving a plurality of jurisdictional entities.

34. The system of claim 20, wherein the information regarding the particular regulated object is shared between the jurisdictional entity and a plurality of nonjurisdictional entities.

35. The system of claim 20, wherein the person inspecting the particular object is associated with the nonjurisdictional entity.

36. The system of claim 20, wherein the person inspecting the particular object is associated with the jurisdictional entity.

* * * * *